US008082492B2

(12) United States Patent
Hattori

(10) Patent No.: US 8,082,492 B2
(45) Date of Patent: Dec. 20, 2011

(54) STRUCTURED-DOCUMENT MANAGEMENT APPARATUS, SEARCH APPARATUS, STORAGE METHOD, SEARCH METHOD AND PROGRAM

(75) Inventor: Masakazu Hattori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1485 days.

(21) Appl. No.: 11/182,008

(22) Filed: Jul. 15, 2005

(65) Prior Publication Data
US 2006/0015809 A1   Jan. 19, 2006

(30) Foreign Application Priority Data

Jul. 15, 2004 (JP) ................................. 2004-208885

(51) Int. Cl.
*G06F 17/21* (2006.01)
(52) U.S. Cl. ........ 715/234; 707/696; 707/697; 707/705; 707/706
(58) Field of Classification Search .................... 715/234
See application file for complete search history.

(56) References Cited

U.S. PATENT DOCUMENTS

| 5,926,823 | A * | 7/1999 | Okumura et al. ............. 715/236 |
| 6,510,425 | B1 * | 1/2003 | Okamoto et al. ..................... 1/1 |
| 7,325,187 | B2 * | 1/2008 | Yashiro .......................... 715/249 |
| 2001/0007987 | A1 * | 7/2001 | Igata ................................. 707/3 |
| 2003/0159110 | A1 * | 8/2003 | Numata et al. ................ 715/513 |
| 2005/0050044 | A1 * | 3/2005 | Takagi et al. ....................... 707/6 |
| 2005/0289185 | A1 * | 12/2005 | Hadley et al. .................. 707/200 |
| 2006/0253465 | A1 * | 11/2006 | Willis et al. .................... 707/100 |
| 2007/0073841 | A1 * | 3/2007 | Ryan et al. ..................... 709/217 |
| 2007/0186157 | A1 * | 8/2007 | Walker et al. ................. 715/530 |
| 2008/0181139 | A1 * | 7/2008 | Rangarajan et al. .......... 370/256 |
| 2009/0012956 | A1 * | 1/2009 | Wen et al. .......................... 707/5 |

FOREIGN PATENT DOCUMENTS

| GB | 2 351 167 A | 12/2000 |
| JP | 2000-57163 | 2/2000 |
| JP | 2001-34618 | 2/2001 |
| JP | 2004-32774 | 1/2004 |

OTHER PUBLICATIONS

European Search Report issued by the European Patent Office, dated Sep. 7, 2005, for European Patent Application No. 05254160.4-2201 PCT.

(Continued)

*Primary Examiner* — Laurie Ries
*Assistant Examiner* — Zaida Marrero
(74) *Attorney, Agent, or Firm* — Finnegan, Henderson, Farabow, Garrett & Dunner, L.L.P.

(57) ABSTRACT

A structured-document management apparatus includes data storage which stores a plurality of structured document data items each including a plurality of elements, common-structure storage which stores a common structure including a plurality of structures included in the structured document data items, a first acquisition unit configured to acquire a new structured document data item, an update unit configured to update the common structure into a new common structure including the structures and a plurality of structures included in the new structured document data item, a second acquisition unit configured to acquire a differential structure between the new common structure and a structure of the new structured document data item, differential structure storage which stores the differential structure, and a storing unit configured to store an array of elements of the new structured document data item into the data storage, the array being arranged based on the differential structure.

9 Claims, 30 Drawing Sheets

OTHER PUBLICATIONS

A. Nierman et al., "Evaluating Structural Similarity in XML Documents," Proceedings of the Fifth International Workshop on the Web and Databases (Jun. 2002), XP-002342386.

T. Miyahara et al., "Discovery of Frequent Tag Tree Patterns in Semistructured Web Documents," Proceedings of the 6th Pacific-Asia Conference on Advances in Knowledge Discovery and Data Mining (May 8, 2002), XP-002342387.

K. Hatano et al., "Extraction of Partial XML Documents Using IR-Based Structure and Contents Analysis," Proceedings of ER'01:20th International Conference on Conceptual Modeling (Nov. 30, 2001), XP-002342385.

Notification of Reasons for Rejection mailed Sep. 9, 2008 in Japanese Patent Application No. 2004-208885.

U.S. Patent Application for Masakazu Hattori et al., U.S. Appl. No. 10/935,627, filed Sep. 8, 2004.

U.S. Patent Application for Masakazu Hattori et al., U.S. Appl. No. 11/053,173, filed Feb. 9, 2005.

U.S. Patent Application for Masakazu Hattori et al., U.S. Appl. No. 09/714,627, filed Nov. 17, 2000.

* cited by examiner

Document A

```
<BOOK>
  <TITLE>Database</TITLE>
  <AUTHORS>
   <AUTHOR>
    <FIRSTNAME>Taro</FIRSTNAME>
    <LASTNAME>Tanaka</LASTNAME>
   </AUTHOR>
   <AUTHOR>
    <FIRSTNAME>Jiro</FIRSTNAME>
    <LASTNAME>Sato</LASTNAME>
   </AUTHOR>
  </AUTHORS>
  <ABSTRACT>
   Simultaneous execution control···
  </ABSTRACT>
</BOOK>
```

FIG. 3

Document B

```
<BOOK>
  <TITLE>Network</TITLE>
  <AUTHORS>
   <AUTHOR>
    <FIRSTNAME>Taro</FIRSTNAME>
    <LASTNAME>Suzuki</LASTNAME>
   </AUTHOR>
   <AUTHOR>
    <FIRSTNAME>Taro</FIRSTNAME>
    <LASTNAME>Tanaka</LASTNAME>
   </AUTHOR>
   <AUTHOR>
    <FIRSTNAME>Saburo</FIRSTNAME>
    <LASTNAME>Yamada</LASTNAME>
   </AUTHOR>
  </AUTHORS>
  <KEYWORD>
   Communication protocol···
  </KEYWORD>
</BOOK>
```

FIG. 4

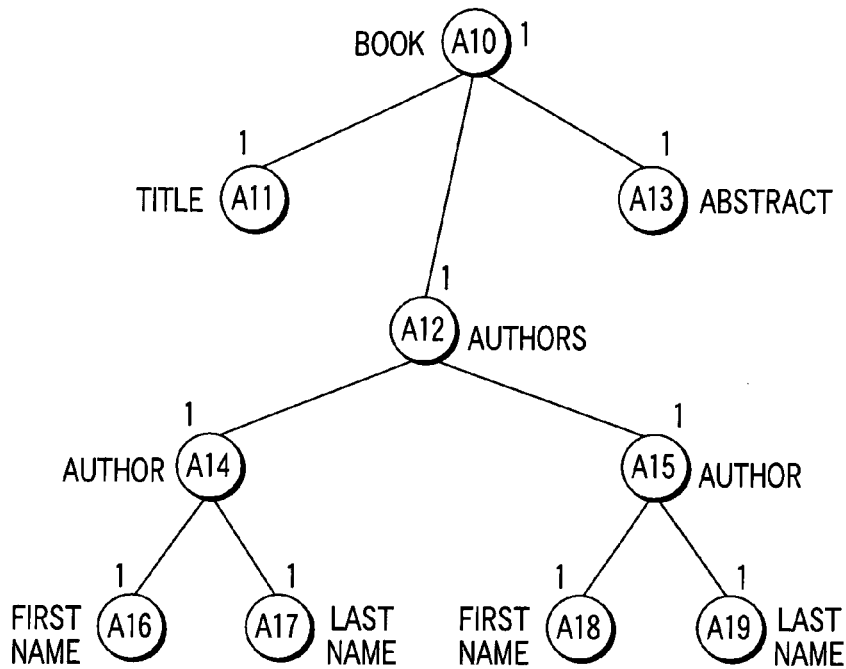
F I G. 9
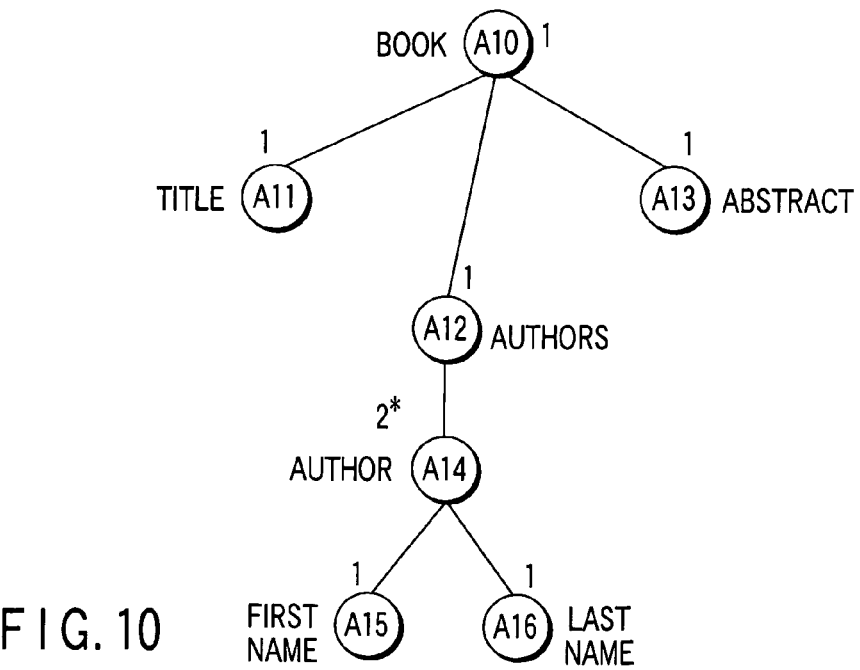
F I G. 10

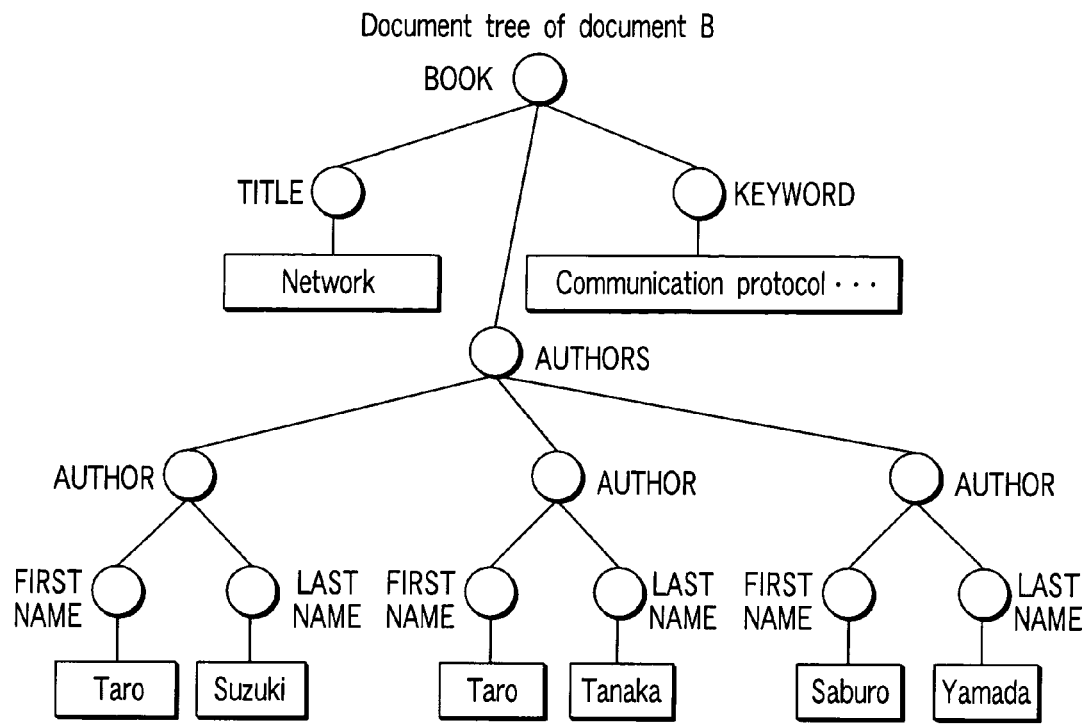
F I G. 11
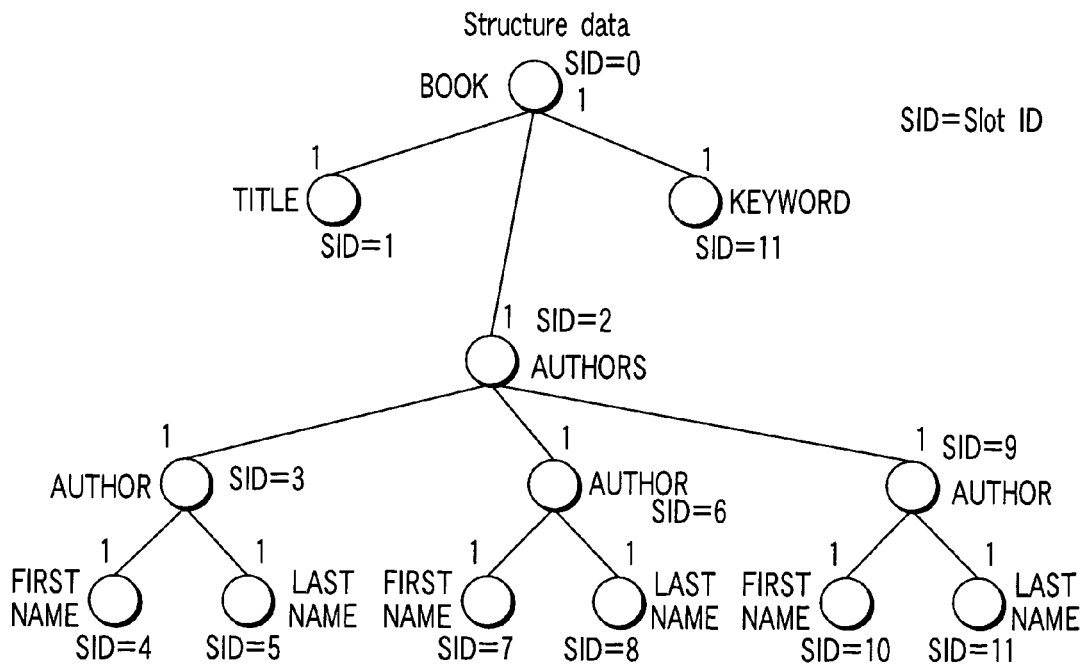
F I G. 12

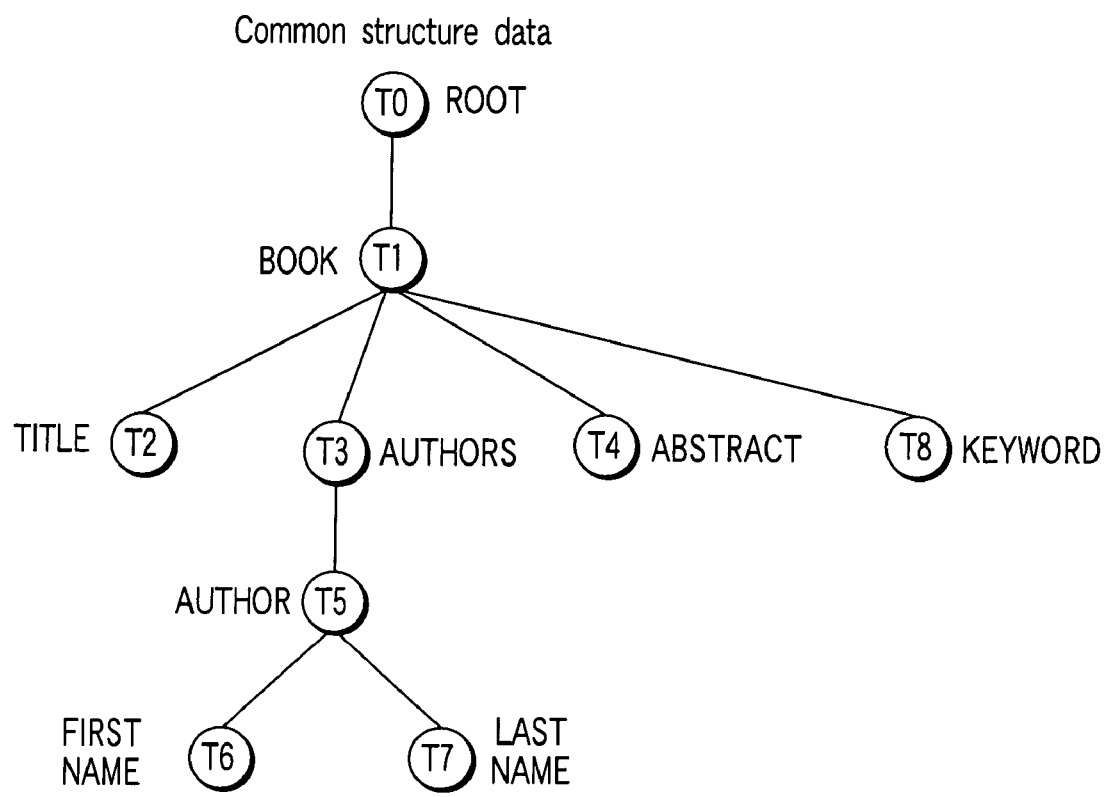
F I G. 13

Document C

```
<BOOK>
  <TITLE>Database</TITLE>
  <AUTHORS>
   <AUTHOR>
     <FIRSTNAME>Taro</FIRSTNAME>
     <LASTNAME>Tanaka</LASTNAME>
   </AUTHOR>
   <AUTHOR>
     <FIRSTNAME>Jiro</FIRSTNAME>
   </AUTHOR>
  </AUTHORS>
  <KEYWORD>
  Simultaneous execution control···
  </KEYWORD>
</BOOK>
```

```
db("DB")//BOOK[
    //AUTHOR[
        contains(./FIRSTNAME,"Taro")AND contains(./LASTNAME,"Tanaka")
    ]
]
```

F I G. 31

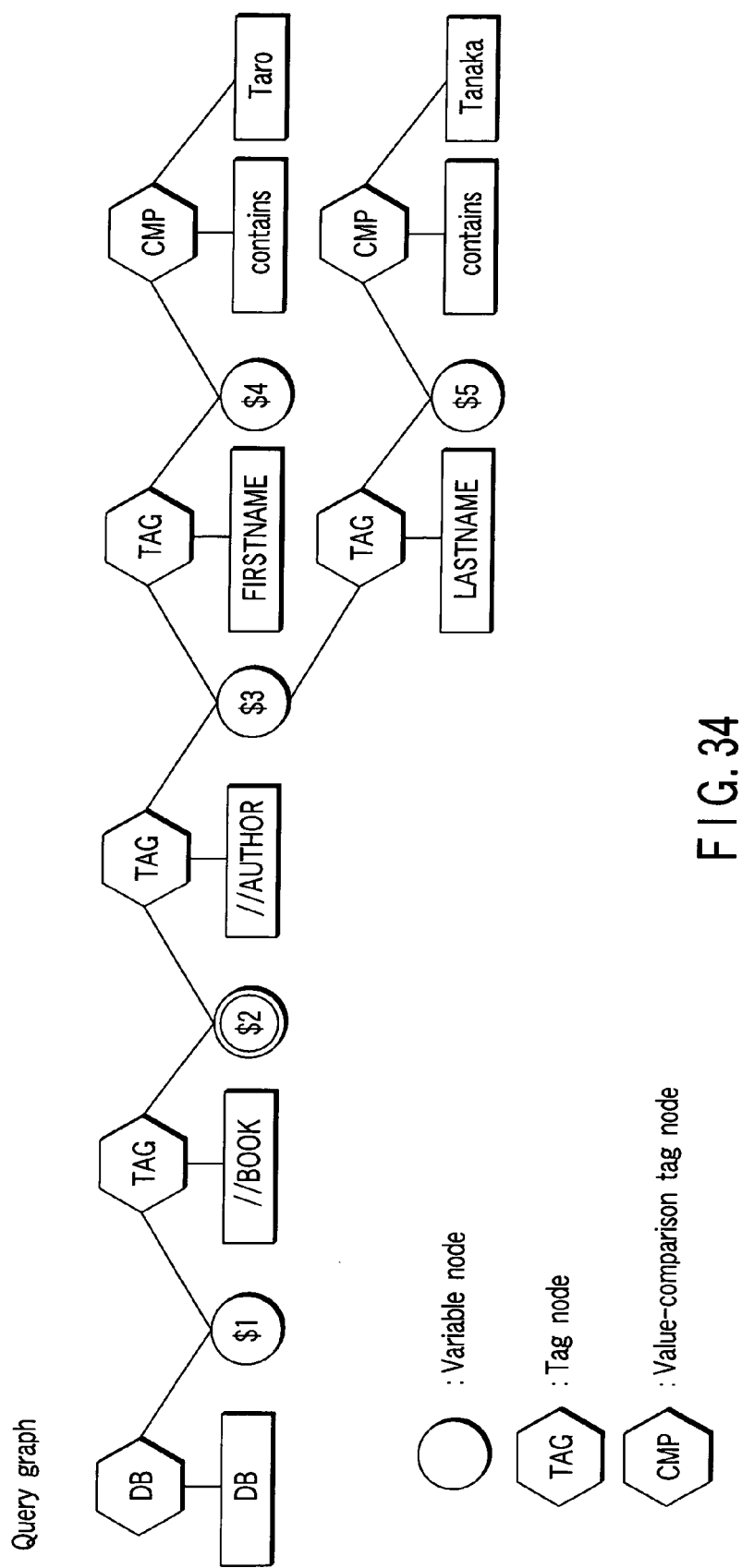
F I G. 34

```
<BOOK>
 <TITLE>Database</TITLE>
 <AUTHORS>
  <AUTHOR>
   <FIRSTNAME>Taro</FIRSTNAME>
   <LASTNAME>Tanaka</LASTNAME>
  </AUTHOR>
  <AUTHOR>
   <FIRSTNAME>Jiro</FIRSTNAME>
   <LASTNAME>Sato</LASTNAME>
  </AUTHOR>
 </AUTHORS>
 <ABSTRACT>
   Simultaneous execution control···
 </ABSTRACT>
</BOOK>
<BOOK>
 <TITLE>Network</TITLE>
 <AUTHORS>
  <AUTHOR>
   <FIRSTNAME>Taro</FIRSTNAME>
   <LASTNAME>Suzuki</LASTNAME>
  </AUTHOR>
  <AUTHOR>
   <FIRSTNAME>Taro</FIRSTNAME>
   <LASTNAME>Tanaka</LASTNAME>
  </AUTHOR>
  <AUTHOR>
   <FIRSTNAME>Saburo</FIRSTNAME>
   <LASTNAME>Yamada</LASTNAME>
  </AUTHOR>
 </AUTHORS>
 <KEYWORD>
   Communication protocol···
 </KEYWORD>
</BOOK>
```

FIG. 36 db("DB")//BOOK//AUTHOR[
                contains(./LASTNAME,"Tanaka")
]

Query graph

FIG. 39

(a) Index scanning

Table7

| $3 | |
|---|---|
| Document A | 5 |
| Document B | 8 |
| ... | ... |

Structure scanning (b) Table8

| $2 | |
|---|---|
| Document A | 3 |
| Document B | 6 |
| ... | ... |

FIG. 40

```
<AUTHOR>
 <FIRSTNAME>Taro</FIRSTNAME>
 <LASTNAME>Tanaka</LASTNAME>
</AUTHOR>
<AUTHOR>
 <FIRSTNAME>Taro</FIRSTNAME>
 <LASTNAME>Tanaka</LASTNAME>
</AUTHOR>
```

STRUCTURED-DOCUMENT MANAGEMENT APPARATUS, SEARCH APPARATUS, STORAGE METHOD, SEARCH METHOD AND PROGRAM

CROSS-REFERENCE TO RELATED APPLICATIONS

This application is based upon and claims the benefit of priority from prior Japanese Patent Application No. 2004-208885, filed Jul. 15, 2004, the entire contents of which are incorporated herein by reference.

BACKGROUND OF THE INVENTION

1. Field of the Invention

The present invention relates to a structured-document database having a hierarchical logic structure.

2. Description of the Related Art

There are structured-document management systems of different schemes for storing and searching structured document data written in, for example, Extensible Markup Language (XML).

(1) A simple scheme for managing structured document data as text file data: In this scheme, when the data amount or size is increased, the efficiency of storage may well be degraded, or it may become difficult to perform searches utilizing the characteristics of structured documents.

(2) A scheme for storing structured document data in a relational database (RDB).

(3) A scheme for performing management utilizing an object-oriented database (OODB) developed to manage structured document data RDBs are widely utilized in fundamental systems. Further, XML-enabled RDBs as extended RDBs are available. Since RDBs store data in the form of a flat table, they require complex mapping that enables XML data of a hierarchical structure to correspond to a table. Because of this mapping, the performance may well be degraded unless a satisfactory schema is designed for tables in advance.

New schemes other than the above-mentioned ones (1 to 3) have recently been proposed.

(4) A scheme for simply managing structured document data: In this scheme, XML data having various hierarchical structures are stored without any particular mapping processing. Accordingly, no particular overhead exists during storage or acquisition of data. Further, this scheme does not require pre-schema-designing that costs much, which enables the structure of XML data to be easily changed in accordance with changes in business circumstances.

Even if structured document data is efficiently stored, there is no meaning unless means for acquiring stored data exists. A query language exists as means for acquiring stored data. Like Structured Query Language (SQL) in the field of RDBs, XML Query Language (XQuery) is defined. XQuery is a language for treating XML data as a database. There is provided means for acquiring, collecting and/or analyzing data sets suitable for a condition. Moreover, since XML data has a hierarchical structure in which elements, such as parent/children and siblings, are combined, means for following the structure is provided.

Jpn. Pat. Appln. KOKAI Publications Nos. 2002-34618 and 2000-57163, for example, disclose a technique for following the hierarchical structure of stored structured document data to search for structured document data that includes a particular element and structure designated by search conditions.

In general, the larger the scale of structured document data, the larger the number of structured document data items stored in a database, and the more complex the search conditions, the more time the process of following the elements included in the hierarchical structure of each structured document data item requires. Furthermore, as the number of structured document data items stored and the size of each structured document data item increase, it becomes impossible to process the data items in a memory, and hence most of them are stored in secondary storage such as a hard disk.

In the scheme for simply managing structured document data, the hierarchical structure of the elements of the structured document data is stored directly. Therefore, to check whether there is an element or structure designated by search conditions, it is necessary to frequently access the elements of the structured document data stored in secondary storage. The same can be said all the more of complex search conditions.

In the reference art, when a structured document data item having a desired element or structure is retrieved from a database that stores structured document data items having hierarchical structures, it is searched for using search conditions while the elements of the hierarchical structure of each structured document data item in the database are traversed. Therefore, high-speed search is impossible. The greater the size of each structured document data item, the larger the number of structured document data items to be searched for, and the more complex the search conditions, the more difficult the speed of search processing to enhance.

BRIEF SUMMARY OF THE INVENTION

The present invention has been developed in light of the above-described circumstances, and aims to provide a structured-document management apparatus and search apparatus capable of searching for structured document data at high speed.

In accordance with a first aspect of the invention, there is provided a structured-document management apparatus comprising: data storage which stores a plurality of structured document data items each including a plurality of elements; common structure storage which stores a common structure including a plurality of structures included in the structured document data items; a first acquisition unit configured to acquire a new structured document data item; an update unit configured to update the common structure into a new common structure including the structures and a plurality of structures included in the new structured document data item; a second acquisition unit configured to acquire a differential structure between the new common structure and a structure of the new structured document data item; differential structure storage which stores the differential structure; and a storing unit configured to store an array of elements of the new structured document data item into the data storage, the array being arranged based on the differential structure.

In accordance with a second aspect of the invention, there is provided a search apparatus comprising: storage which stores a plurality of structured document data items each including a plurality of elements; an acquisition unit configured to acquire a search condition for searching for a desired element included in the elements; and a search unit configured to search, for the desired element, a certain structured document data item included in the structured document data items, the search unit including: a reconstructing unit configured to reconstruct a structure of the certain structured document data item, based on a differential structure between the structure of the certain structured document data item and a common structure, the common structure including a plurality of structures included in the structured document data items, and also including the structure of the certain structured document data item; and a detecting unit configured to detect the desired element from the reconstructed structure.

In accordance with a third aspect of the invention, there is provided a method comprising: storing a new structured document data item into storage which stores a plurality of structured document data items each including a plurality of elements; acquiring a common structure including a plurality of structures included in the structured document data items and the new structured document data item; acquiring a differential structure between the common structure and a structure of the new structured document data item; and storing an array of elements of the new structured document data item into the storage, the array being arranged based on the new differential structure.

In accordance with a fourth aspect of the invention, there is provided a method comprising: searching, for a desired element, a certain structured document data item included in a plurality of structured document data items each including a plurality of elements; reconstructing a structure of the certain structured document data item, based on a differential structure between the structure of the certain structured document data item and a common structure, the common structure including a plurality of structures included in the structured document data items, and also including the structure of the certain structured document data item; and detecting the desired element from the reconstructed structure.

In accordance with a fifth aspect of the invention, there is provided a program stored in a medium which is read by a computer the program comprising: means for instructing the computer to store a plurality of structured document data items each including a plurality of elements, a new structured document data item stored by instruction of the program; means for instructing the computer to acquire a common structure including a plurality of structures included in the structured document data items and the new structured document data item; means for instructing the computer to acquire a differential structure between the common structure and a structure of the new structured document data item; and means for instructing the computer to store an array of elements of the new structured document data item into the storage, the array being arranged based on the new differential structure.

In accordance with a sixth aspect of the invention, there is provided a program stored in a medium which is read by a computer, the program comprising: means for instructing the computer to store a plurality of structured document data items each including a plurality of elements, the program serving as a search apparatus for searching, for a desired element, a certain structured document data item included in the structured document data items; means for instructing the computer to reconstruct a structure of the certain structured document data item, based on a differential structure between the structure of the certain structured document data item and a common structure, the common structure including a plurality of structures included in the structured document data items, and also including the structure of the certain structured document data item; and means for instructing the computer to detect the desired element from the reconstructed structure.

BRIEF DESCRIPTION OF THE SEVERAL VIEWS OF THE DRAWING

FIG. 3 is a view illustrating an example (document A) of structured document data;

FIG. 4 is a view illustrating another example (document B) of structured document data;

FIG. 9 is a view illustrating first differential structure data that indicates the difference between the common structure data of FIG. 8 and the document A;

FIG. 10 is a view illustrating second differential structure data that indicates the difference between the common structure data of FIG. 8 and the document A;

FIG. 11 is a view illustrating the document tree of the document B;

FIG. 12 is a view illustrating the structure data of the document B;

FIG. 13 is a view illustrating another common structure data example;

FIG. 31 is a view illustrating a query data example;

FIG. 34 is a view illustrating a query graph acquired from the query data of FIG. 31;

FIG. 36 is a view illustrating a result data example;

FIG. 39 is a view useful in explaining a search process based on the query graph of FIG. 38; and FIG. 40 is a view illustrating another result data example.

DETAILED DESCRIPTION OF THE INVENTION

An embodiment of the invention will be described with reference to the accompanying drawings.

Figure 1:
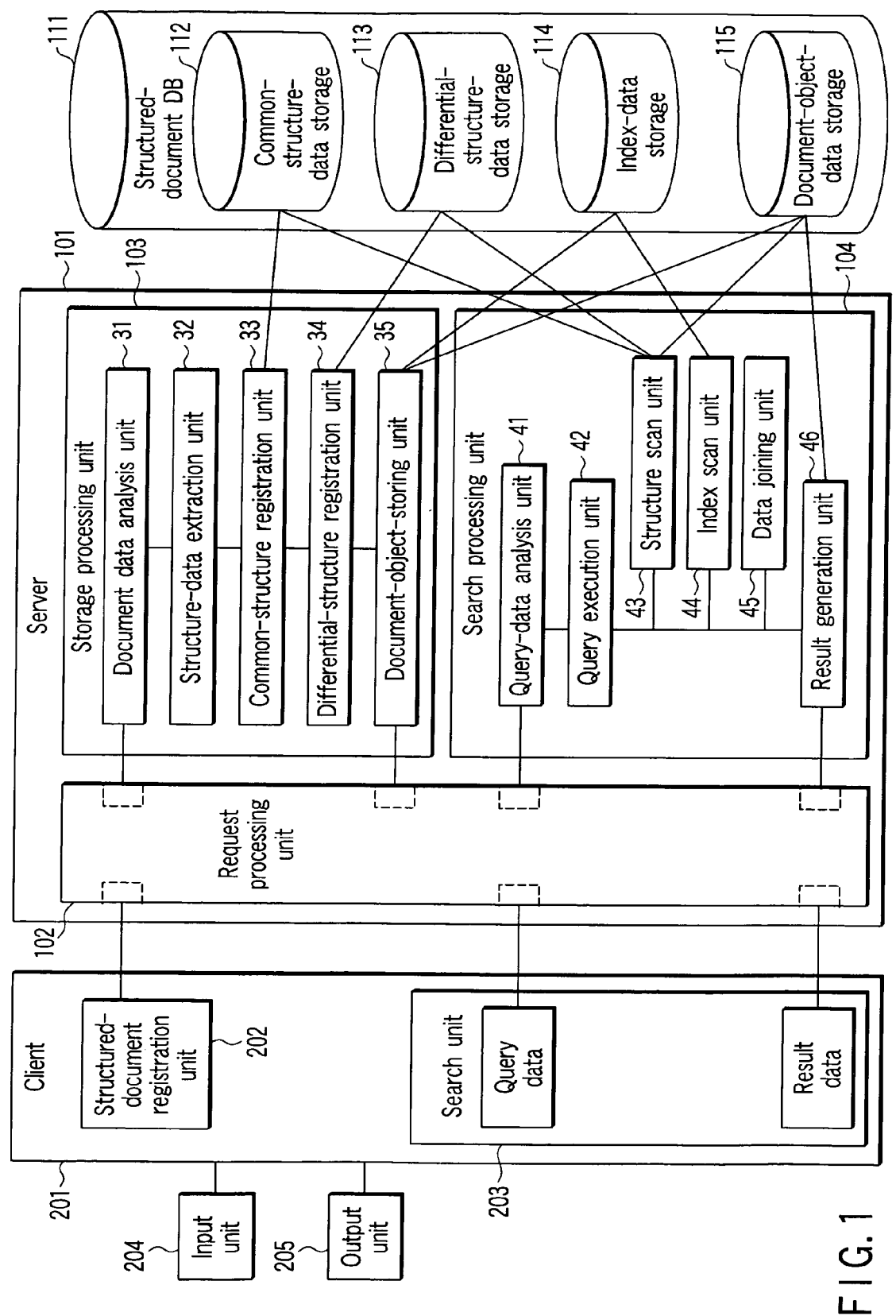
FIG. 1 is a view illustrating a functional configuration example of a structured-document management system according to an embodiment of the invention.

FIG. 1 is a view illustrating a functional configuration example of a structured-document management system according to the embodiment of the invention. As shown, the structured-document management system basically includes a client 201 and server 101. Upon receiving a request to store data or to search data from the client 201, the server 101 performs corresponding processing.

The client 201 mainly includes a structured-document registration unit 202, search unit 203, input unit 204 and output unit 205. The input unit 204 formed of input devices, such as a keyboard and mouse, is used to input structured documents and various instructions. The structured-document registration unit 202 is used to store, into a structured-document database (structured-document DB) 111, structured documents prestored in, for example, a storage unit incorporated in the client 201. The structured-document registration unit 202 transmits a storage request to the serve 101, together with a to-be-stored structured document.

In accordance with an instruction input by a user through the input unit 204, the search unit 203 generates query data including, for example, search conditions for searching the structured-document database 111 for desired data, and transmits a search request containing the query data to the server 101. Further, the search unit 203 receives result data corresponding to the search request and returned from the server 101, and displays it on the output unit 205.

The server 101 comprises a request processing unit 102, storage processing unit 103 and search processing unit 104. Further, the server 101 is connected to the structured-document database 111. The structured-document database 111 comprises common-structure-data storage 112, differential-structure-data storage 113, index-data storage 114, document-object-data storage 115.

The request processing unit 102 determines whether a request transmitted from the client 201 is a storage request or search request, distributes the determined request to the storage processing unit 103 or search processing unit 104, and returns the processing result of the storage processing unit 103 or search processing unit 104 to the client 201.

The storage processing unit 103 receives a storage request from the client 201, and stores a structured document from the client 201 into the structured-document database 111. The storage processing unit 103 comprises a document data analysis unit 31, structure-data extraction unit 32, common structure registration unit 33, differential-structure registration unit 34, and document-object-storing unit 35.

The document data analysis unit 31 analyzes the construction of each structured document sent from the request processing unit 102. Based on the analysis result, the structure-data extraction unit 32 extracts the (document) structure data of the structured document. The differential-structure registration unit 34 stores, into the differential-structure-data storage 113, the difference between the structure data and the common structure data stored in the common-structure-data storage 112. The common structure registration unit 33 updates the common structure data stored in the common-structure-data storage 112.

The document-object-storing unit 35 stores structured document data into the document-object-data storage 115, and also stores, into the document-object-data storage 115, index data for detecting the locations of terms included in the structured document data. Object data corresponding to each element (node) of structured document data items analyzed by the document data analysis unit 31 is stored into the document-object-data storage 115 in the order based on the differential structure data extracted from the structured document data items.

The search processing unit 104 receives a search request from the client 201, detects, in the structured-document database 111, data corresponding to conditions (query data) designated in the request, and returns the detected data as detection result data to the client 201. The search processing unit 104 basically comprises a query-data analysis unit 41, query execution unit 42 and result generation unit 46. The query execution unit 42 includes a structure scan unit 43, index scan unit 44 and data joining unit 45.

The query-data analysis unit 41 analyzes the construction of query data sent from the request processing unit 102. Based on the analysis results, the query execution unit 42 refers to the common structure data stored in the common-structure-data storage 112, the differential structure data stored in the differential-structure-data storage 113 and the index data stored in the index-data storage 114, utilizing the structure scan unit 43 and index scan unit 44. The query execution unit 42 then joins the reference results, utilizing the data joining unit 45.

Based on the data acquired from the data joining unit 45, the result generation unit 46 reads object data from the document-object-data storage 115, and generates data that coincides with the conditions contained in the query data.

Figure 2:
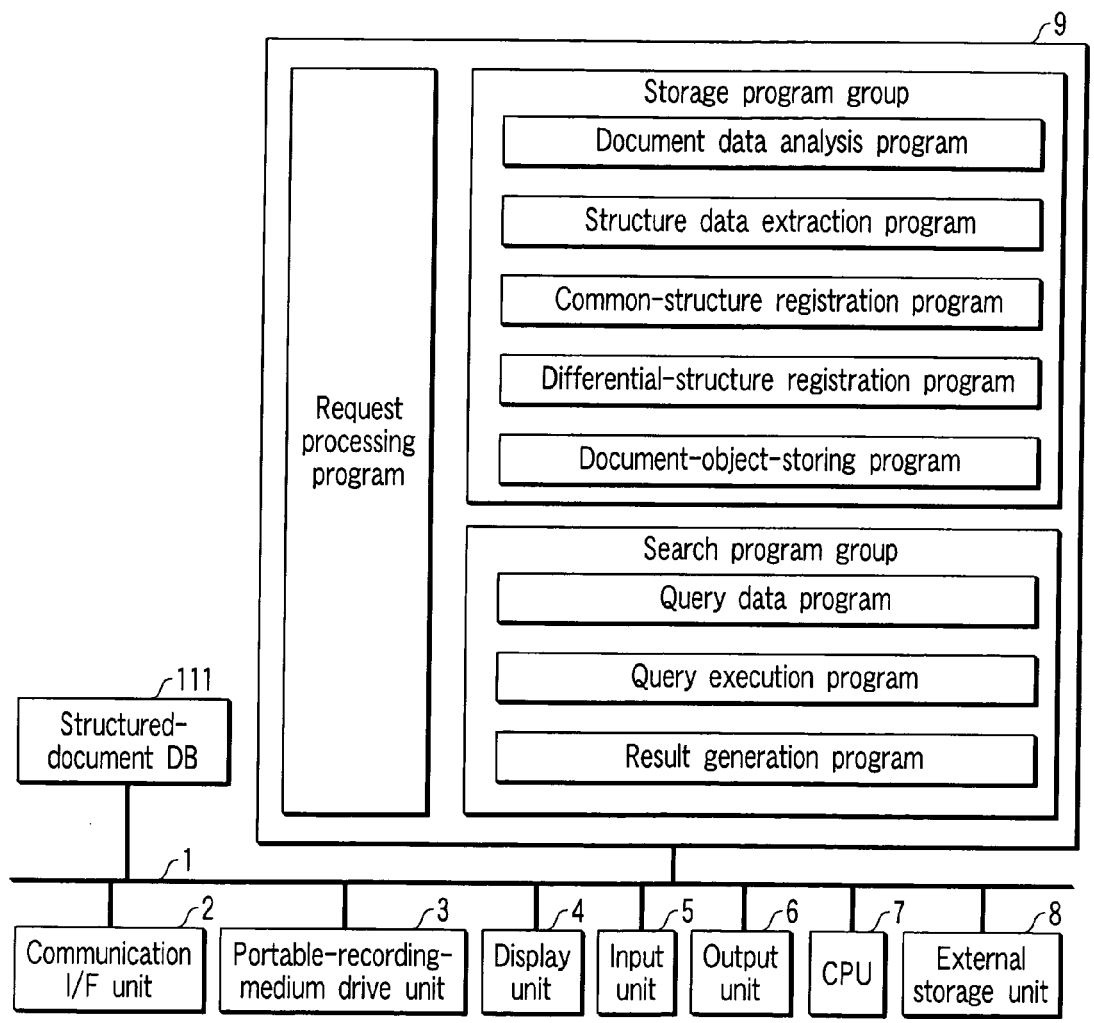
FIG. 2 is a view illustrating a hardware configuration example of a server.

FIG. 2 shows a hardware configuration example of the server 101. As shown, a bus 1 is connected to a communication I/F unit 2, portable-recording-medium drive unit 3, display unit 4, input unit 5, output unit 6, computation unit (CPU) 7, external storage unit 8 and memory 9. In the configuration of FIG. 2, the bus 1 is further connected to the structured-document database 111 appearing in FIG. 1.

The programs for realizing the functions of the request processing unit 102, storage processing unit 103 and search processing unit 104 are prestored in the external storage unit 8 shown in FIG. 2, and read therefrom into the memory 9 to be executed.

FIG. 3 shows an example of structured document data. EXtensible Markup Language (XML) is exemplified as a typical language used to express a structured document. The document (document A) shown in FIG. 3 is written in XML. In XML, each component part of a structure document is called an "element", and each element is written using tags. Specifically, each element is expressed by interposing text data between two tags, i.e., a tag (start tag) indicating the start of each element, and a tag (end tag) indicating the end of each element. The text data held between the start and end tags is a text element (text node) included in a single element expressed by the start and end tags.

In the example of FIG. 3, an element held between tags <BOOK> and </BOOK> includes a root element and three child elements held between <TITLE> and </TITLE>, between <AUTHORS> and </AUTHORS> and between <ABSTRACT> and </ABSTRACT>. The child element held between <TITLE> and </TITLE> includes a text element "database". Further, the child element held between <AUTHORS> and </AUTHORS> includes two child elements each held between <AUTHOR> and </AUTHOR>.

FIG. 4 shows another example of the structured document data, which is similar to the example of FIG. 3. The structured document data items shown in FIGS. 3 and 4 differ in that, in the latter, the structured document data (document B) includes three <AUTHOR> elements, and a <KEYWORD> element instead of the <ABSTRACT> element.

Structured documents expressed in, for example, XML are characterized in the following points:
 They are hierarchical data models;
 They may contain the same elements;
 They contain elements arranged in order; and
 They may or may not have a schema.

Figure 5:
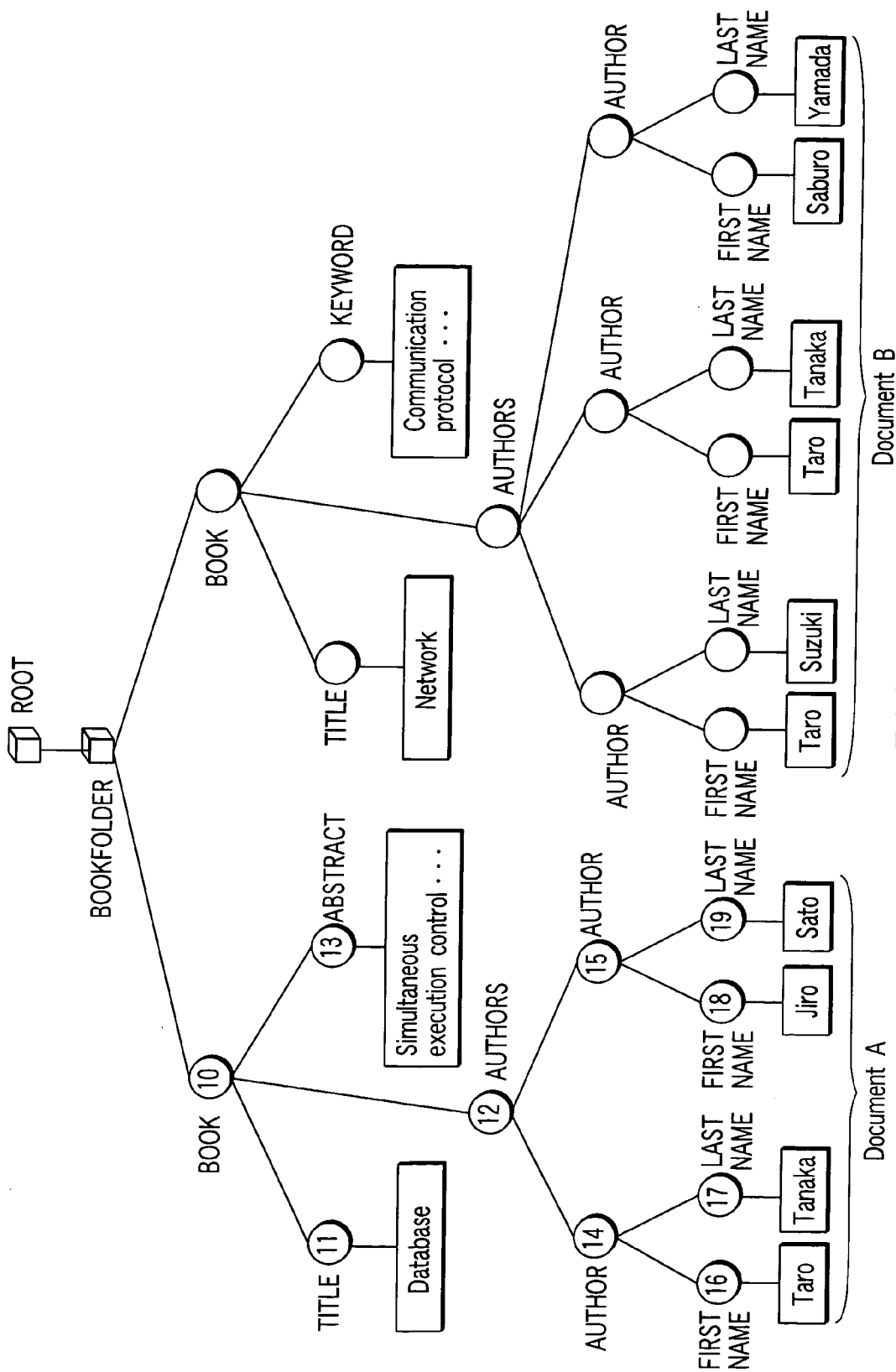
FIG. 5 is a view illustrating the data structure of a structured-document database.

FIG. 5 logically illustrates the data structure of a structured-document database, which has a tree structure formed of nodes and arcs. A large number of structured documents are stored as parts of a single structured document using a node "ROOT" as a root.

A node "BOOKFOLDER" exists as the child node of the root node "ROOT". Under the node "BOOKFOLDER", the respective sub-trees of the documents A and B shown in FIGS. 3 and 4 exist.

In the case of FIG. 5, concepts of "folder" and "document" are used. Specifically, the nodes "ROOT" and "BOOKFOLDER" are regarded as folders, and a plurality of documents (in this case, two documents A and B) exist under the folders.

Actually, each node (including each text node) is held as a file for object data in the document-object-data storage 115. An identifier, called an object ID (OID), is assigned to each node (including each text node). In FIG. 5, for facilitating the description, OIDs are expressed by numerals. Any desired object data can be acquired by designating its OID. Actually, each OID contains a document ID as an identifier assigned to a structured document including the each node (including each text node), and a slot ID indicating the slot position, in the storage area of the structured document, of object data corresponding to the each node.

The attributes of the objects corresponding to the respective nodes include information, such as child node OIDs and parent node OIDs, concerning arcs, and also include tag names.

(Storage)

Referring now to FIGS. 6 to 10, the operation of the storage processing unit 103 performed when the document A shown in FIG. 3 is stored into the structured-document DB 111 will be described briefly. Assume here that the document A is the first structured document data stored in the structured-document DB 111. In this case, common structure data does not yet exist.

Figure 6:
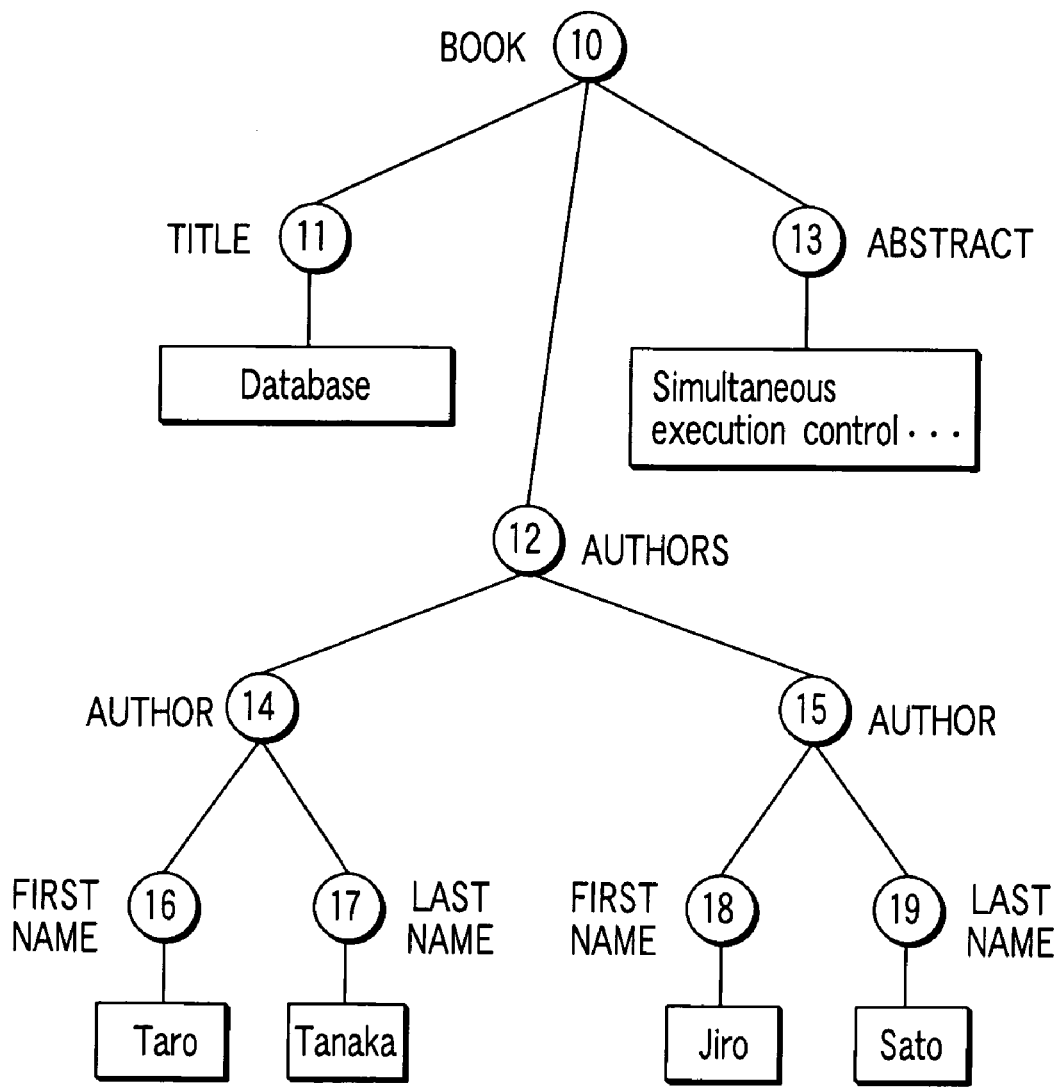
FIG. 6 is a view illustrating the document tree of the document A.

Upon receiving a request to store the document A issued from the client 201, firstly, the document data analysis unit 31 analyzes the construction of the document A, thereby outputting a document tree, which is positioned under a node "BOOK" as a root node, as shown in FIG. 6. This process can be realized using a structure analysis technique represented by a publicly known compiler & compiler tool, such as Yacc & Lex.

Figure 7:
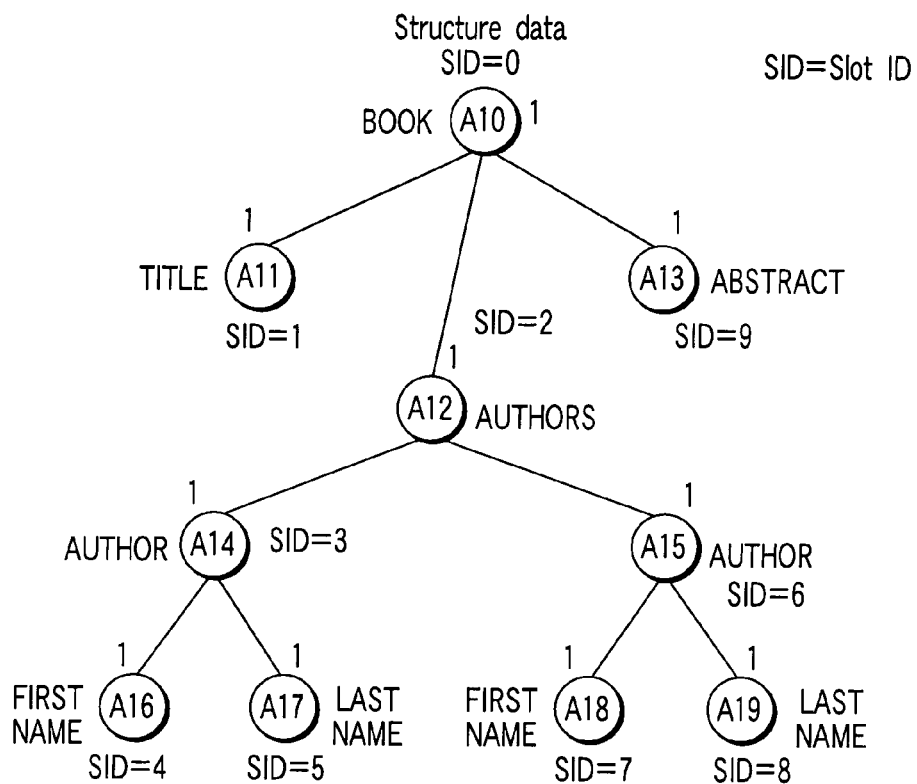
FIG. 7 is a view illustrating the structure data of the document A.
Figure 8:
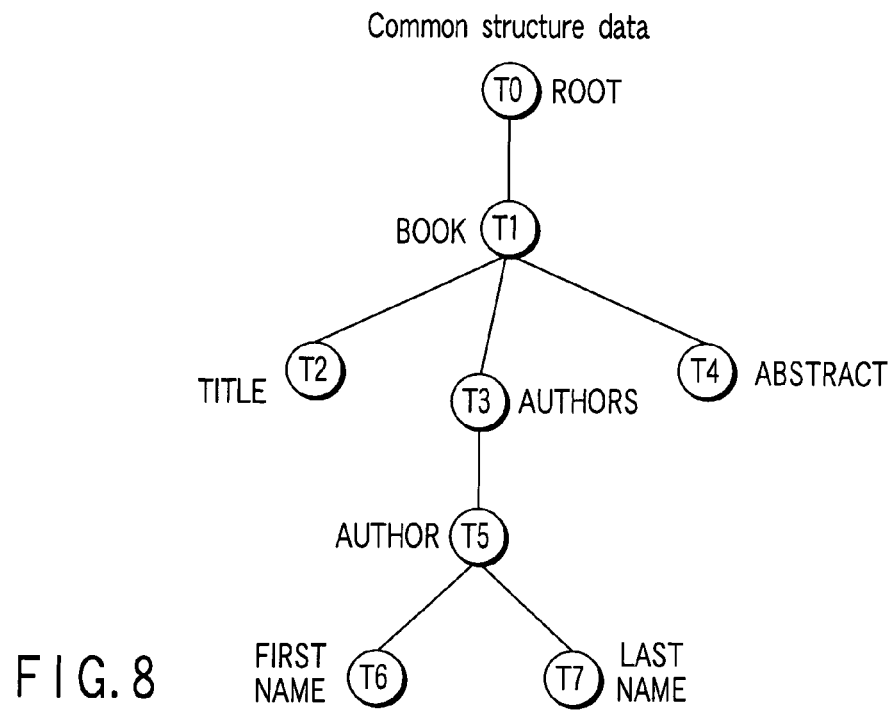
FIG. 8 is a view illustrating a common structure data example.

The structure-data extraction unit 32 acquires such structure data as that shown in FIG. 7 from such a document tree as that shown in FIG. 6. The common structure registration unit 33 acquires such a common structure as that shown in FIG. 8 from the common structure shown in FIG. 7, and stores it into the common-structure-data storage 112. The common structure represents a structure commonly employed in the structured documents stored. As shown in FIG. 8, in the common structure, a plurality of sibling nodes with the same tag name is represented by a single node. Note that in the common-structure-data storage 112, a node "ROOT" for common structure data is initially generated as a root node that unifies a tree representing the common structure data.

The differential-structure registration unit 34 acquires information concerning the structure that is included in the structure data of the document A shown in FIG. 7, and not included in the common structure data shown in FIG. 8, i.e., acquires such differential structure data (second differential structure data) as shown in FIG. 10. In this embodiment, to acquire the second differential structure data, such first differential structure data as shown in FIG. 9 is acquired. In the description below, if only the second differential structure data included in the first and second differential structure data is indicated, it may be referred to simply as the "differential structure data".

The node "AUTHORS" of the structure data of the document A includes two nodes "AUTHOR". Namely, the same sub-structures (sub-trees) exist. However, since this repetitive structure is excluded from the common structure, it is expressed as the second differential structure data as shown in FIG. 10.

In the second differential structure data, if the same sub-tree (part or all of the same sub-tree) is repeatedly detected below a certain node of structure data, information indicating the number of detections of the sub-tree is added as attribute information to the certain node, and only a single sub-tree is used to represent the same sub-trees, as shown in FIG. 10. In this case, if a node (indefinite node) that is not always included in the same sub-trees exists, a mark "?" indicating that the node is an indefinite node is attached as attribute information to the node.

The common structure data covers a plurality of structured document data items stored so far, while one differential structure data item exists for each structured document data item stored. Further, when a structured document data item is stored, if this data item contains a node that is not included in the present common structure data, the node is added to the common structure data. Accordingly, the common structure data size is simply increased.

Node IDs for identification are assigned to the respective nodes of the common structure data stored in the common-structure-data storage 112. In the case of the common structure shown in FIG. 8, node ID "T0" indicates a root node, and node IDs "T1" to "T7" are assigned to the other nodes. Namely, when the document A is stored, the common structure data used to acquire differential structure data contains nodes with node IDs "T0" to "T7". When other structured document data items are added, new nodes are added to the common structure data. New node IDs that indicate the order of addition are attached to the new nodes. In the embodiment, to discriminate common structure data as a timestamp, the last node ID of the common structure data is stored in the differential-structure-data storage 113 together with the differential structure data.

Figure 16:
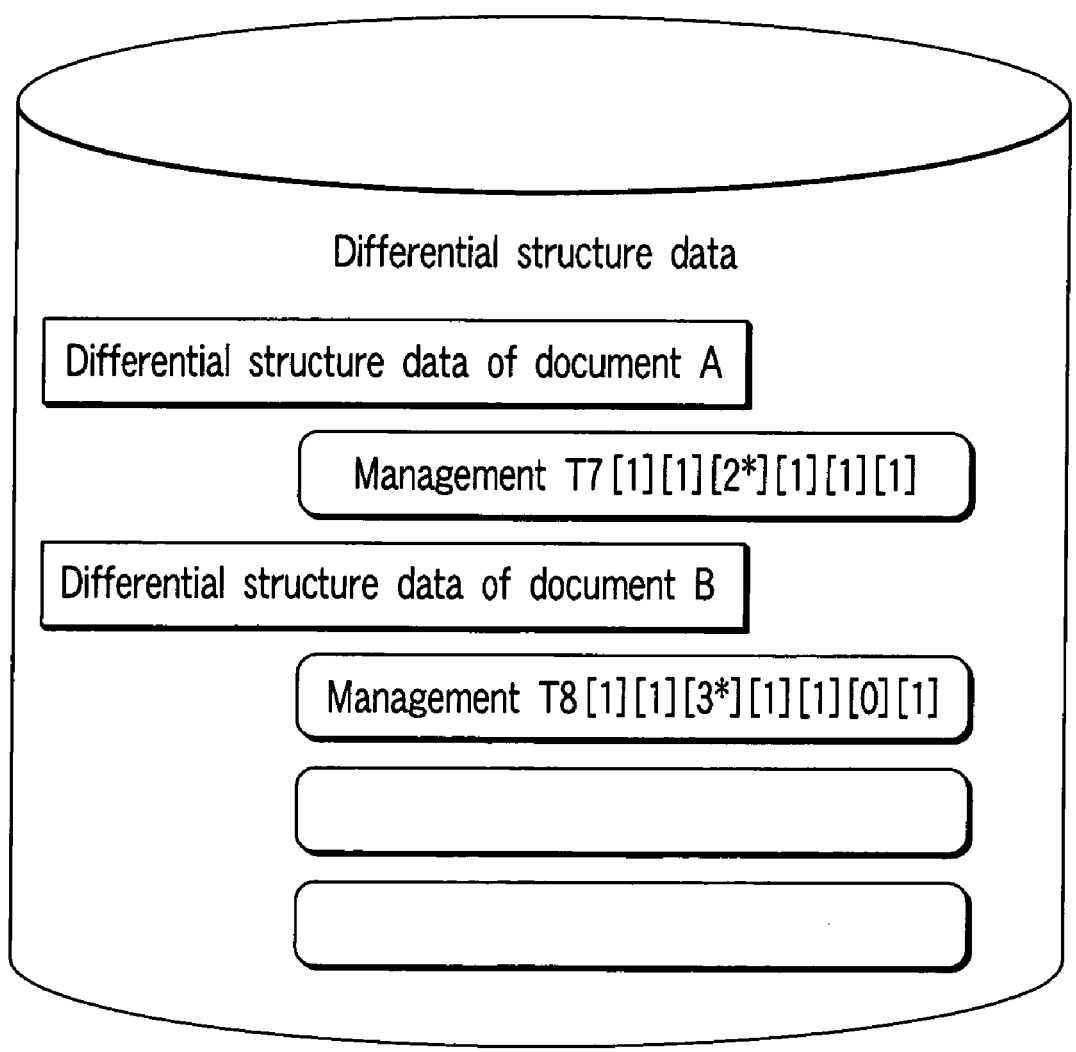
FIG. 16 is a view illustrating a storage example of differential structure data.

The differential structure data of the document A is stored in the differential-structure-data storage 113 in a data array form of, for example, "Management T7[1][1][2*][1][1][1]" as shown in FIG. 16, together with the last node ID, "T7", of the common structure data used to acquire the differential structure data.

Based on the differential structure data shown in FIG. 10, the document-object-storing unit 35 stores, into the document-object-data storage 115, arranged object data items corresponding to the respective nodes (including text nodes) of the document tree. The document-object-data storage 115 has a plurality of storage areas for storing respective structured document data items, and each storage area is divided into a plurality of slots. Each slot has a slot ID indicating its position, and is used to store each object data item of the structured document data corresponding to each storage area. The structured document data item stored in one storage area is called a document object record. The document object record is an array of a plurality of elements that form the structured document data. The position information items of the elements of the array correspond to the respective slot IDs.

Figure 17:
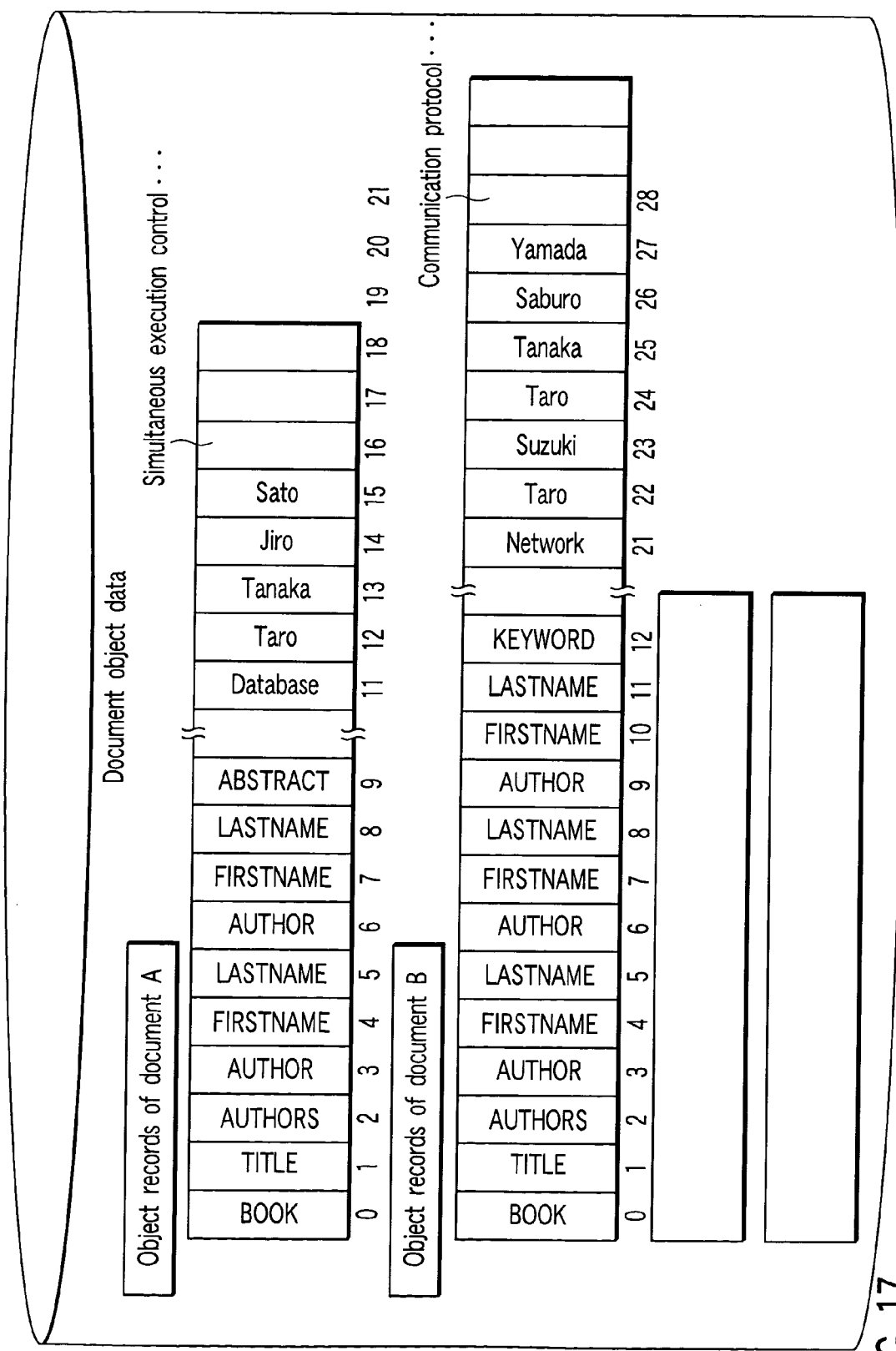
FIG. 17 is a view illustrating a storage example of document object records (array)

As shown in FIG. 17, in a storage area that stores a document (e.g., the document A), the object data items corresponding to the respective nodes of the common structure data are firstly stored, and then indefinite nodes or text nodes in the document tree are sequentially stored. The object data items are stored in the order beginning with the left node of the differential structure data, and in the order beginning with the highest-class node of the differential structure data.

A brief description will be given of the operation of the storage processing unit 103 performed when storing the document B of FIG. 4 into the structured-document DB 111. More specifically, a description will be given of the case where the common structure data shown in FIG. 8 is stored into the common-structure-data storage 112.

Upon receiving a request to store the document B issued from the client 201, the document data analysis unit 31 analyzes the construction of the document B, thereby outputting a document tree, which is positioned under a node "BOOK" as a root node, as shown in FIG. 11.

The structure-data extraction unit 32 acquires such structure data as that shown in FIG. 12 from such a document tree as that shown in FIG. 11.

The common structure registration unit 33 compares the common structure data, stored in the common-structure-data storage 112 and shown in FIG. 8, with the structure data shown in FIG. 12, thereby updating the common structure data of FIG. 8. Namely, in this case, the node "KEYWORD", which is not included in the common structure data of FIG. 8 but is included in the structure data of FIG. 12, is added as a child node of the node "BOOK" as shown in FIG. 13. Note that the node ID of the node "KEYWORD" is "T8". Such a common structure as shown in FIG. 8 is acquired from the structure data shown in FIG. 12, and stored in the common-structure-data storage 112.

Figure 14:
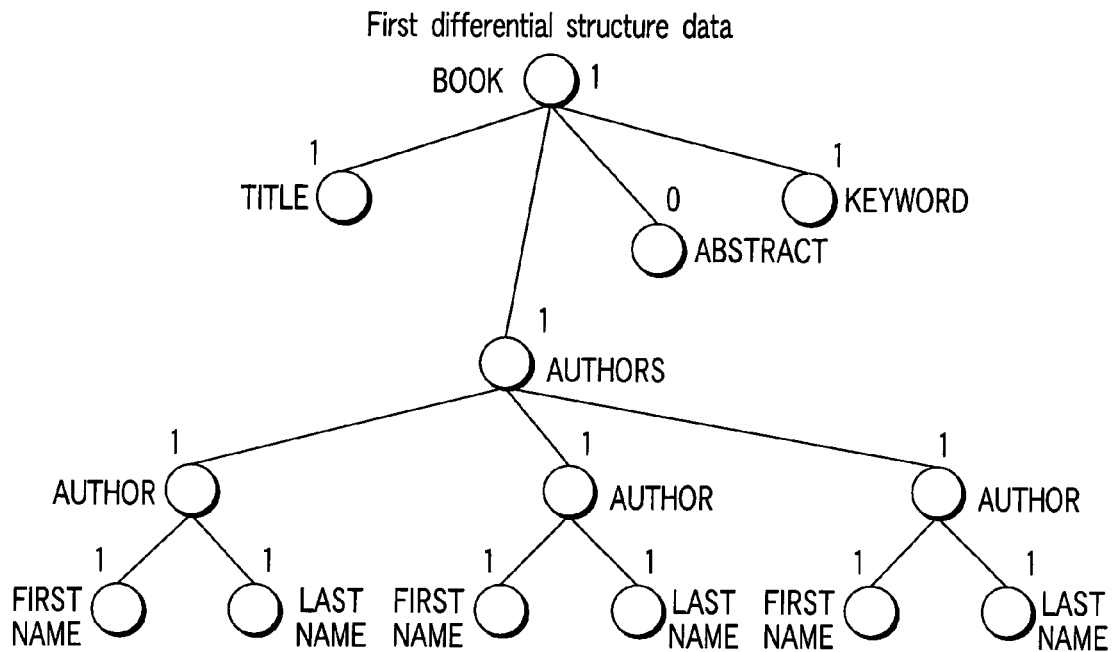
FIG. 14 is a view illustrating first differential structure data that indicates the difference between the common structure data of FIG. 13 and the document B.

The differential structure registration unit 34 acquires differential structure data (see FIG. 15) indicating the differential structure between the structure data of FIG. 12 and the common structure data of FIG. 13. Specifically, the unit 34 acquires such first differential structure data as shown in FIG. 14. As can be understood from FIG. 14, the first differential structure data additionally includes a node that is not included in the structure data of FIG. 12 but is included in the common structure data of FIG. 13, i.e., a node "ABSTRACT". Attribute information "0" indicating that the number of detections is zero is attached to this node. This means that the element denoted by the node "ABSTRACT" does not exist in the document B, but does exist in the common structure data.

A node "AUTHORS" included in the structure data of the document B has three nodes "AUTHOR", which means that the same sub-structures (sub-trees) exist. To express this, in the second differential structure data of FIG. 15, a single sub-structure representing the repetitive structure is used with attribute information "3*" indicating that the number of detections is 3 attached thereto.

The differential structure data of the document B is stored in the differential-structure-data storage 113 in a data array form of, for example, "Management T8[1][1][3*][1][1][0][1]" as shown in FIG. 16, together with the last node ID, "T8", of the common structure data used to acquire the differential structure data.

As shown in FIG. 17, in a storage area that stores the document B, the object data items corresponding to the respective nodes of the common structure data are firstly stored, and then indefinite nodes or text nodes in the document tree are sequentially stored. The object data items are stored in the order beginning with the first child node of the structure below the root node, using the root node of the differential structure data as a start point. Concerning the structure below each child node, the object data items are stored in the order beginning with the highest-class node of the differential structure data and ending with the lowest-class node.

Figure 18:
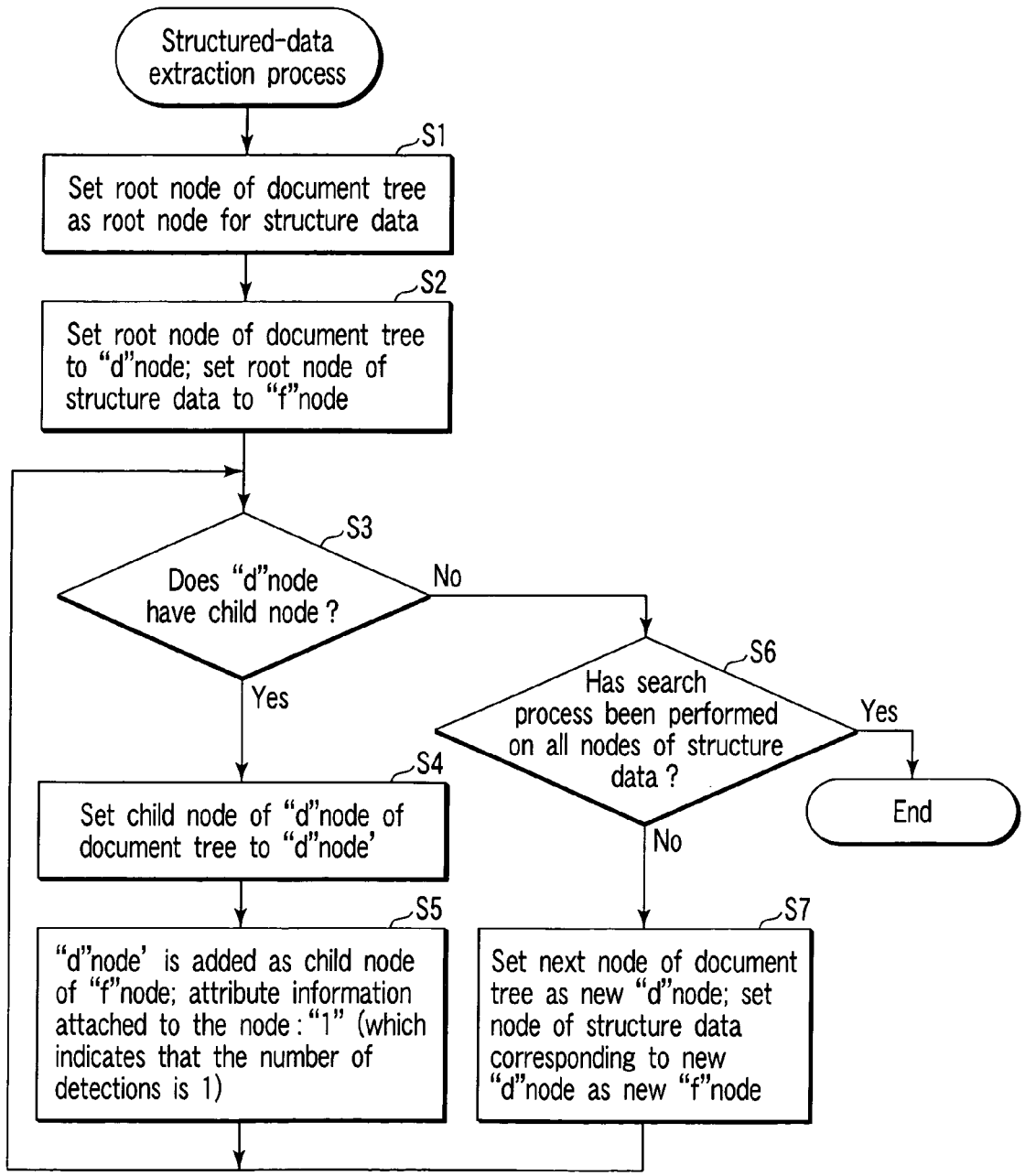
FIG. 18 is a flowchart useful in explaining a structure-data extraction process.

FIG. 18 is a flowchart useful in explaining the structure data extraction processing of the structure-data extraction unit 32. A description will be given of a case example where the structure data of FIG. 7 is extracted from the document tree of FIG. 6. The structure data is extracted by downwardly following the nodes of the document tree beginning with the root node, and adding the detected nodes as those for the structure data.

Specifically, firstly, the root node of the document tree of the document A shown in FIG. 6, output from the document data analysis unit 31, is set as the root node for the structure data (step S1). To add the nodes of the document tree to the structure data below the root node, the root node of the document tree is set as a "d" node, and that of the structure data is set as an "f" node (step S2). If the "d" node includes child nodes (Yes at step S3), the first child node of the "d" node is set as a "d" node' (step S4). The "d" node' is added as a child node of the "f" node, and attribute information "1" indicating that the number of detections is 1 is attached to the child node "d" node' (step S5). After steps S4 and S5 are performed on all child nodes belonging to the "d" node, the "d" node and the "f" node are updated until steps S4 and S5 are performed on all nodes of the document tree (steps S6 and S7). Namely, at step S7, the next node of the document tree (i.e., the node following the node set as the current "d" node) is set as a new "d" node, and the node of the structure data corresponding to the new "d" node is set as a new "f" node. Subsequently, the program returns to step S3, and steps S3 to S5 are repeated.

In the process shown in FIG. 18, the nodes "BOOK", "TITLE" and "AUTHORS" are added in this order below the root node of the structure data. After that, the first child node of the node "AUTHORS", i.e., a node "AUTHOR", is added below the node "AUTHORS", and the child nodes of the node "AUTHOR", i.e., nodes "FIRST NAME" and "LAST NAME", are added below the node "AUTHOR". Similarly, the second child node of the node "AUTHORS", i.e., another node "AUTHOR", is added below the node "AUTHORS", and the child nodes of this node "AUTHOR", i.e., nodes "FIRST NAME" and "LAST NAME", are added below the same. Lastly, a node "ABSTRACT" is added as a child node of the node "BOOK" of the structure data. Attribute information indicating that the number of detections is 1 is attached to each node.

Figure 19:
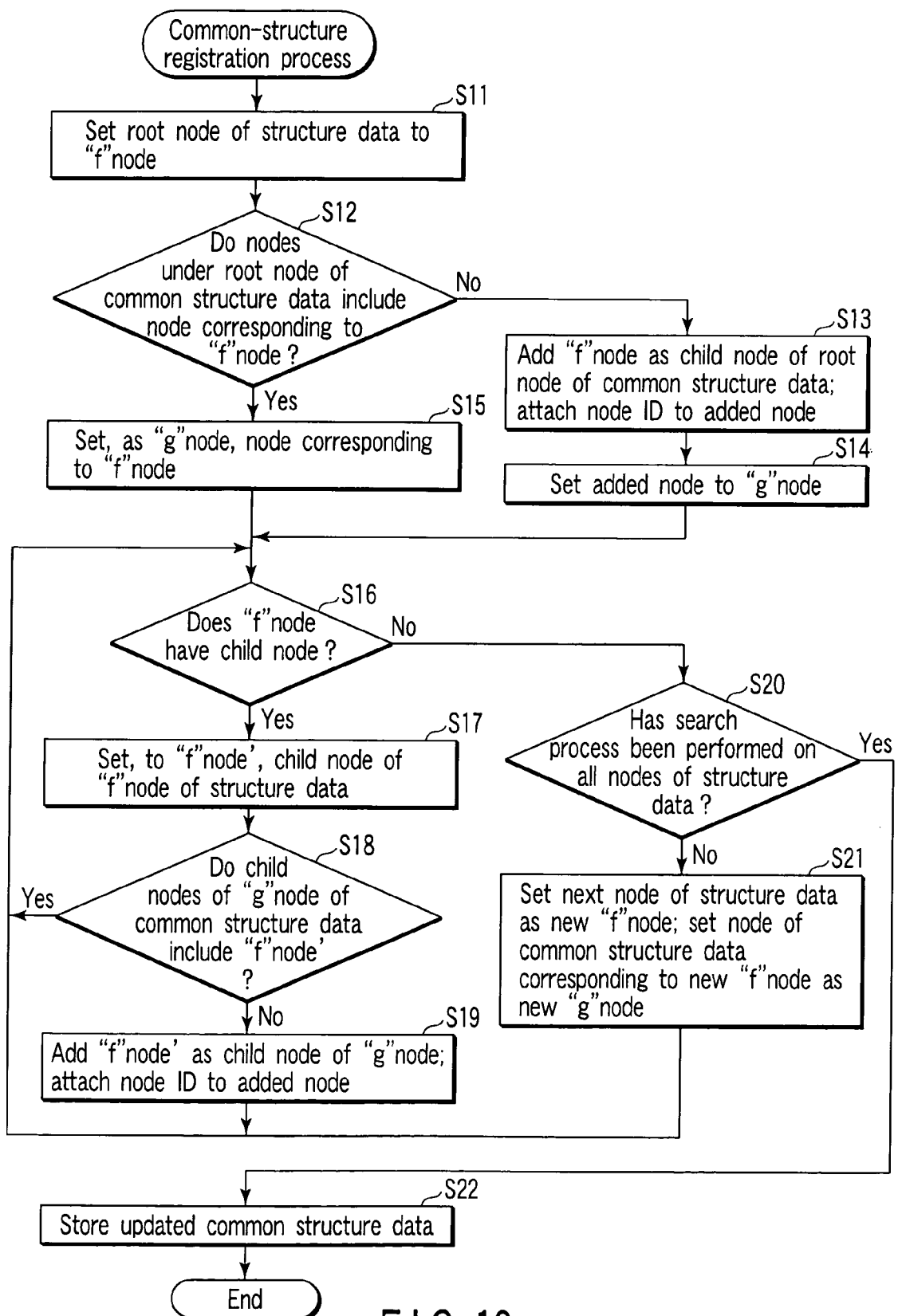
FIG. 19 is a flowchart useful in explaining a common structure registration process.

FIG. 19 is a flowchart useful in explaining the common structure registration processing of the common structure-data registration unit 33. A description will be given of a case example where new common structure data is generated when the first document A included in the structure data of FIG. 7 is stored. In this case, the common structure data is updated by comparing the nodes of the structure data with the nodes of the common structure data while downwardly following the structure data of FIG. 7, thereby adding, to the common structure data, the nodes ("g"nodes) that are not included in the common structure data. As described above, when the same nodes (nodes of the same element name) are detected in the structure data, only one of the nodes is added to the common structure data.

Specifically, the root node "BOOK" of the structure data of the document A shown in FIG. 7, output from the structure-data extraction unit 32, is set as an "f"node (step S11). If the common structure data contains, under the root node "ROOT", a node corresponding to the "f"node, the program proceeds to step S15, whereas if it does not contain such a node, the program proceeds to step S13 (step S12). Since this case is directed to generation of new common structure data, no common structure data exists under the node "ROOT", therefore the program proceeds to step S13, where the "f"node is added as a child node of the node "ROOT". Namely, the node "BOOK" is added, and the node "BOOK" of the structure data is set as a "g"node (step S14).

Thereafter, steps S16 to S21 are repeated, thereby constructing common structure data under the "g"node. Specifically, if the "f"node has child nodes (Yes at step S16), the first child node of the "f"node is set as a "f"node' (step S17). Further, if the "g"node of the common structure data does not contain a node identical to the "f"node' (No at step S18), the "f"node' is added as a child node of the "g"node, and a node ID is attached to the child node (step S19). In contrast, if the "g"node of the common structure data contains a child node identical to the "f"node' (Yes at step S18), the program returns to step S16, thereby setting the second child node of the "f"node as a new "f"node'. After steps S18 and S19 are performed on all child nodes belonging to the "f"node, the "f"node and the "g"node are updated until steps S18 and S19 are performed on all nodes of the structure data (steps S20 and S21). Namely, at step S21, the next node of the structure data (i.e., the node following the node set as the current "f"node) is set as a new "f"node, and the node of the common structure data corresponding to the new "f"node is set as a new "g"node. Subsequently, the program returns to step S16, and steps S16 to S19 are repeated.

By the above-described process, such common structure data as shown in FIG. 8, in which one of the same sub-trees detected in the structure data represents the sub-trees, is acquired. Lastly, such common structure data as shown in FIG. 8 is stored in the common-structure-data storage 112 (step S22).

A description will now be given of the common structure registration processing performed when the document B having the structure data shown in FIG. 12 is stored in a state in which such common structure data as shown in FIG. 8 is already stored. In this case, only points different from those related to the case of storing the document A will be described. At step S15, the node "BOOK" of the common structure data is set as a "g"node. At steps S16 to S21, the common structure data stored in the common-structure-data storage 112 is updated. The node that is included in the structure data of FIG. 12 and is not included in the common structure data of FIG. 8 is the node "KEYWORD". Accordingly, when the node "KEYWORD" as the third child node of the node "BOOK" is set as an "f"node' at step S17, the answer to the question at step S18 is No (since the child nodes of the node "BOOK" of the common structure data of FIG. 8 do not include the node "KEYWORD"). At this time, the program proceeds to step S19, where the node "KEYWORD" is added as another child node of the node "BOOK", and a node ID "T8" is attached to the added node.

From the above process, such common structure data as shown in FIG. 13 is acquired. Lastly, the common structure data stored in the common-structure-data storage 112, which is similar to the common structure data shown in FIG. 13, is updated (step S22).

Figure 20:
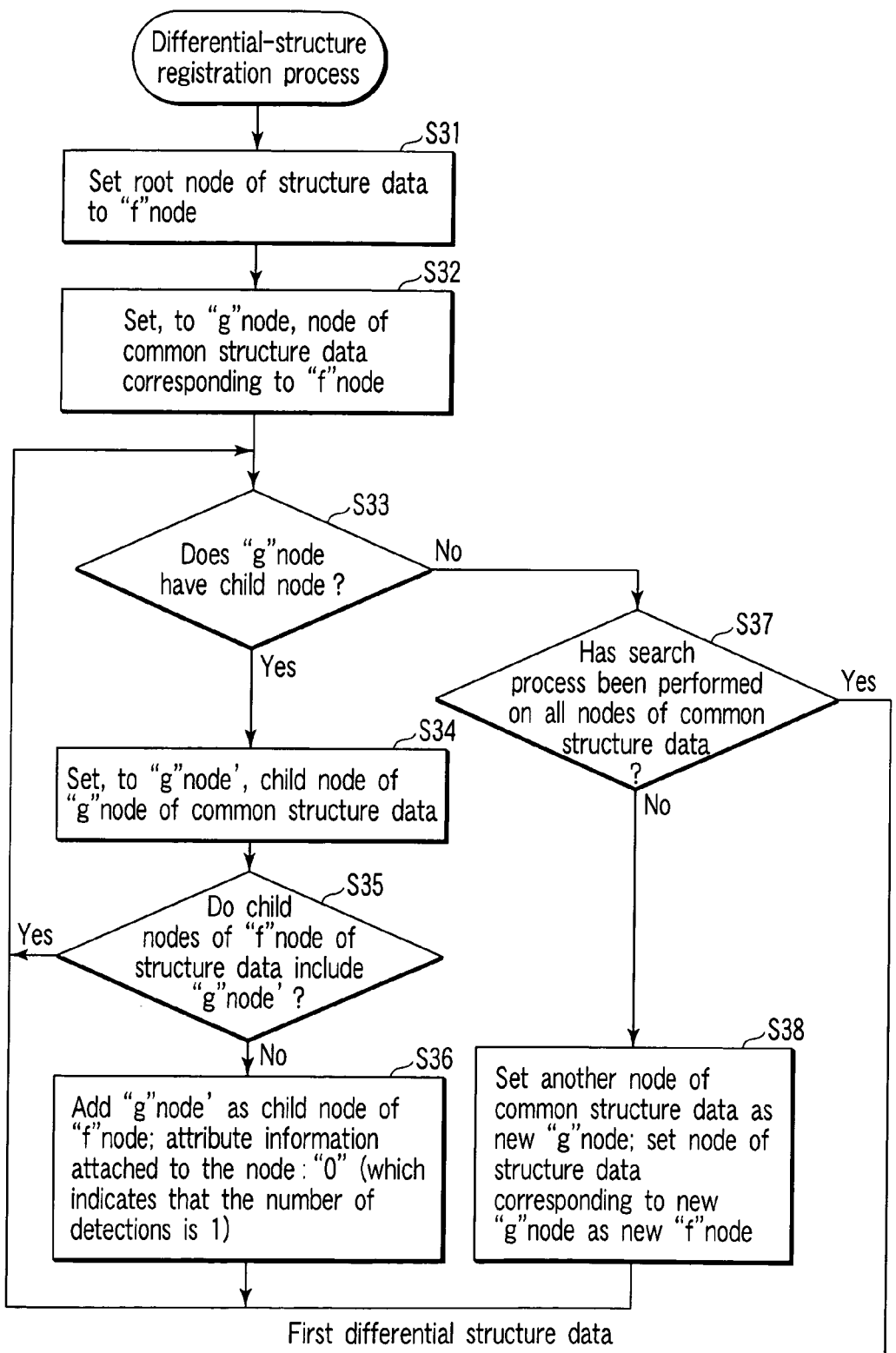
FIG. 20 is a flowchart useful in explaining a differential-structure registration process.
Figure 21:
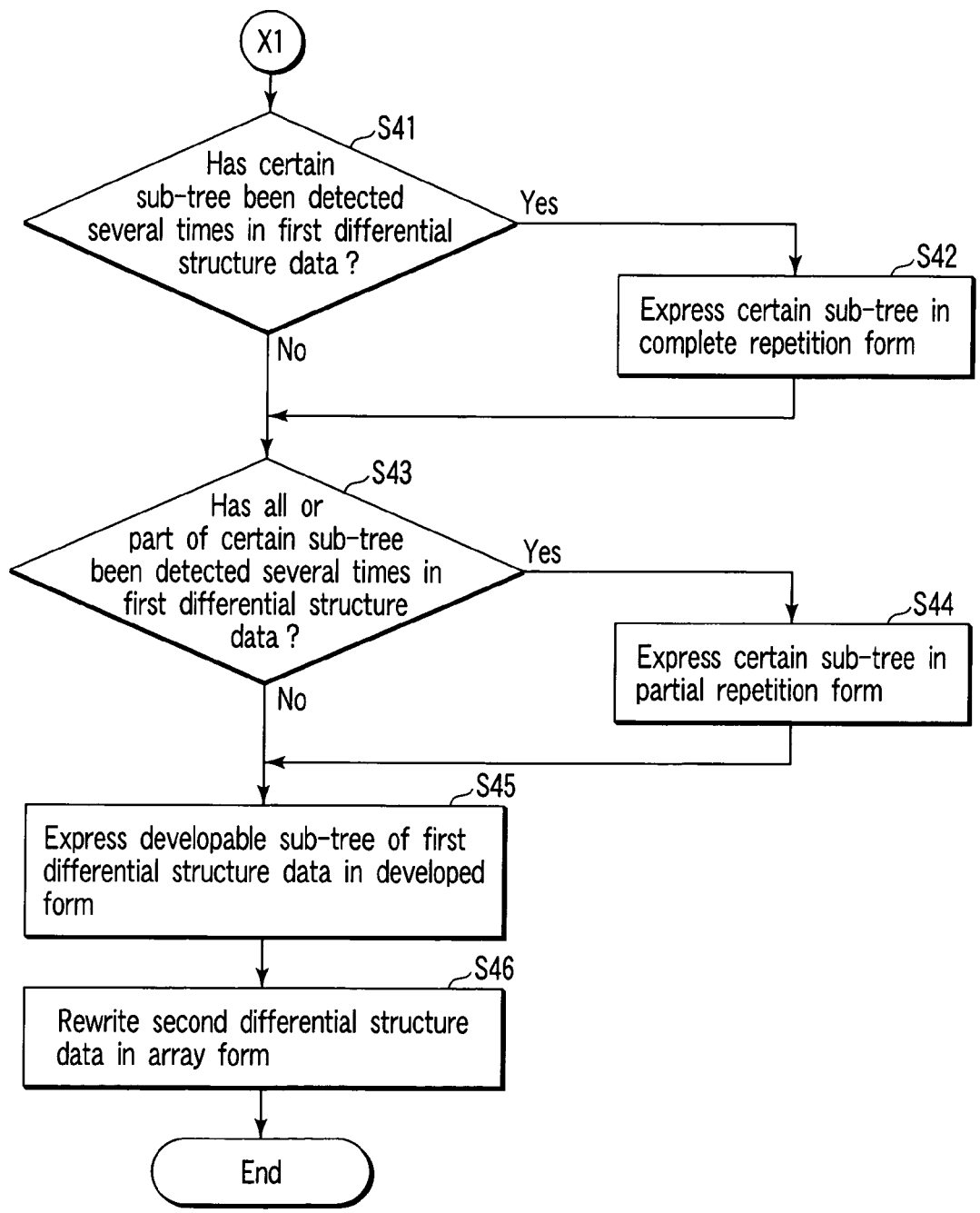
FIG. 21 is another flowchart useful in explaining the differential-structure registration process.

FIGS. 20 and 21 are flowcharts useful in explaining the differential structure registration process performed by the differential structure registration unit 34. A description will be given of the differential structure registration process, using, as an example, a case where the document B having the structure data shown in FIG. 12 is stored.

Firstly, the structure data of FIG. 12 is compared with the common structure data of FIG. 13, thereby detecting the node that is not included in the structure data of FIG. 12 but is included in the common structure data of FIG. 13, i.e., the node "ABSTRACT". Subsequently, the node "ABSTRACT" is added to the structure data with attribute information "0" attached thereto, the attribute information indicating that the number of detections is zero. Thus, such first differential structure data as shown in FIG. 14 is generated.

Specifically, the root node of the structure data shown in FIG. 12 is set as an "f"node (step S31). After that, the node in the common structure data corresponding to the "f"node is set as a "g"node (step S32).

If the "g"node has child nodes (Yes at step S33), the first child node of the "g"node is set as a "g"node' (step S34). Further, if the "f"node of the structure data does not contain a node identical to the "g"node' (No at step S35), the "g"node' is added as a child node of the "f"node, and attribute information "0" indicating that the number of detections is zero is attached to this child node (step S36). In contrast, if the "f"node of the structure data contains a node identical to the "g"node' (Yes at step S35), the program returns to step S33, thereby setting the second child node of the "g"node as a new "g"node' (step S34).

If, for example, the node "ABSTRACT" as the third child node of the node "BOOK" is set as a new "g"node' at step S34, the answer to the question at step S35 is No (since the child nodes of the node "BOOK" of the structure data of FIG. 12 do not include the node "ABSTRACT"). At this time, the program proceeds to step S36, where the node "ABSTRACT" is added as another child node of the node "BOOK", and attribute information "0" indicating that the number of detections is zero is attached to the added node.

After steps S35 and S36 are performed on all child nodes belonging to the "g"node, the "f"node and the "g"node are updated until steps S35 and S36 are performed on all nodes of the common structure data (steps S37 and S38). Namely, at step S38, the next node of the structure data (i.e., the node following the node set as the current "g"node) is set as a new "g"node, and the node of the structure data corresponding to the new "g"node is set as a new "f"node. Subsequently, the program returns to step S33, and steps S33 to S36 are repeated.

From the above-described process, such first differential structure data as shown in FIG. 14 is acquired.

Figure 15:
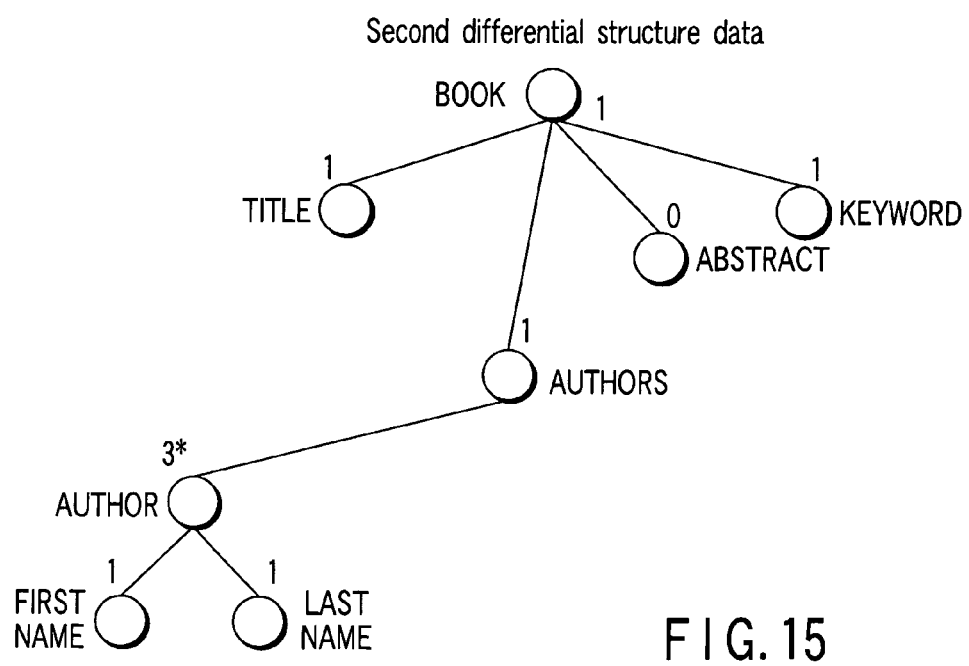
FIG. 15 is a view illustrating second differential structure data that indicates the difference between the common structure data of FIG. 13 and the document B.

Subsequently, such second differential structure data as shown in FIG. 15, in which one of the same sub-structures included in the first differential structure data represents them, is generated. If the same sub-tree is detected a number of times below a certain node of the first differential structure data (Yes at step S41 in FIG. 21), this repetitive structure is rewritten in a complete repetition form (step S42). Namely, the same sub-trees are represented by a single sub-tree included in them, and attribute information indicating the number of detections of the sub-tree is attached to the root node of the sub-tree.

The first differential structure data of FIG. 14 contains, under the node "AUTHORS", three same sub-trees that use the node "AUTHOR" as a root. Accordingly, as shown in FIG. 15, one of the three sub-trees represents them, and attribute information "3" indicating that the number of detections of the sub-tree is 3 is attached to the root node "AUTHOR" of the sub-tree.

If the same sub-trees are detected below a certain node of the first differential structure data, and if at least one of the sub-trees has only part of the structure of any other sub-tree (Yes at step S43), the repetitive structure is rewritten in a partial repetition form (step S44).

The partial repetition form will now be described, using the structure data shown in FIG. 24 as an example. The structure data of FIG. 24 contains, under a node "AUTHORS", two sub-trees using a node "AUTHOR" as a root. One of the sub-trees does not include a node "LAST NAME", whereas the other sub-tree has the same structure as the structure data of the document B (see FIG. 12).

Figure 24:
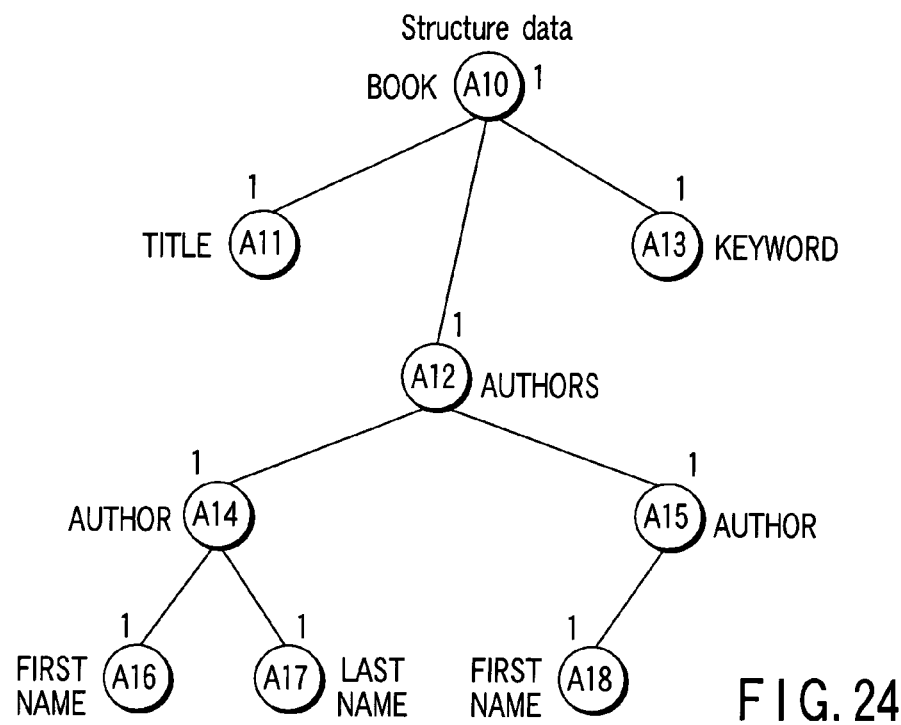
FIG. 24 is a view illustrating the structure data of the document C.
Figure 25:
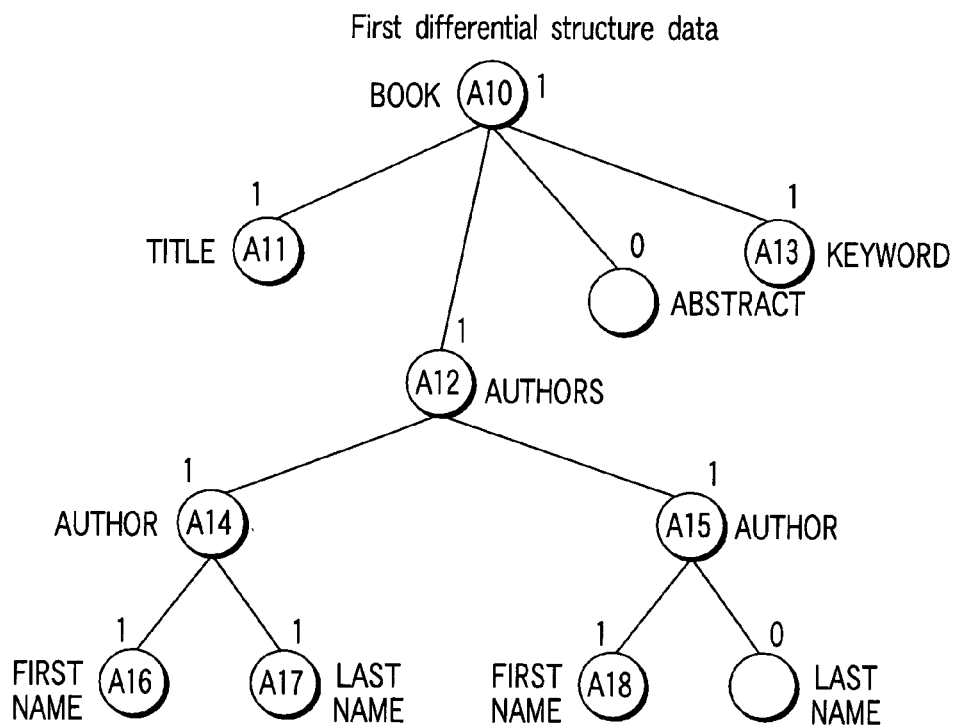
FIG. 25 is a view illustrating first differential structure data that indicates the difference between the common structure data of FIG. 13 and the document C.
Figure 26:
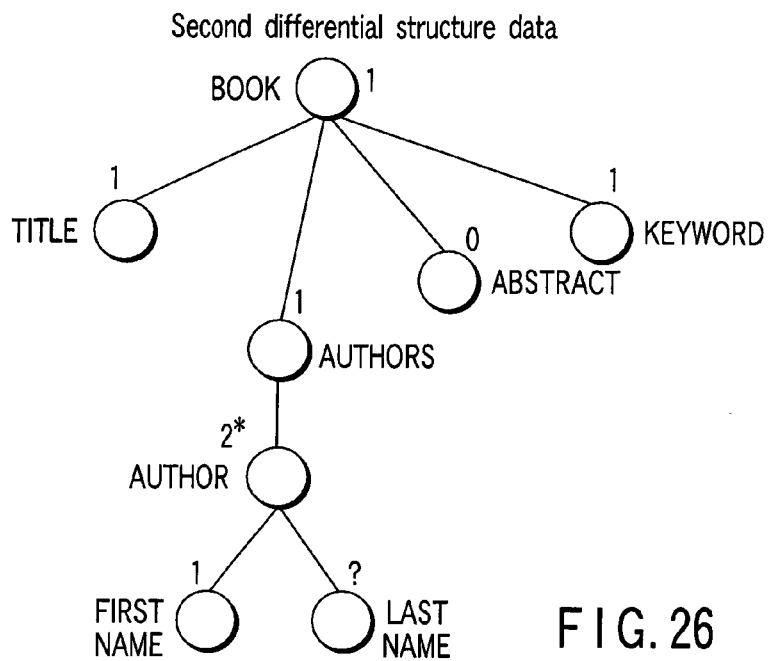
FIG. 26 is a view illustrating second differential structure data that indicates the difference between the common structure data of FIG. 13 and the document C.

FIG. 25 shows first differential structure data indicating the differential between the structure data of FIG. 24 and the common structure data of FIG. 13. Further, FIG. 26 shows second differential structure data in which one of the same sub-structures in FIG. 25 represents them.

The first differential structure data of FIG. 25 contains, under the node "AUTHORS", two sub-trees using the node "AUTHOR" as a root. One of the sub-trees does not include the node "LAST NAME". Accordingly, at step S44 in FIG. 21, as shown in FIG. 26, one of the two sub-trees is used as a representative, and attribute information "2" indicating the number of detections of the sub-trees is attached to the root node "AUTHOR" of the sub-tree. Further, attribute information "?" indicating an indefinite node is attached to the node "LAST NAME" included in the sub-tree.

Referring back to FIG. 21, the portion other than the repetitive structure in the first differential structure data (i.e., the portion that does not include a repetitive structure and can be expressed by an information amount not more than a predetermined threshold value, with its developed form unchanged) is expressed in the developed form (step S45). Namely, the sub-tree formed of the nodes "BOOK", "TITLE", "AUTHORS", "ABSTRACT" and "KEYWORD" in the first differential structure data of FIG. 14 is kept unchanged in the second differential structure data of FIG. 15.

The second differential structure data acquired by the above-described process is rewritten in a data array form (step S46). Specifically, the respective numbers of detections attached to the nodes of the second differential structure data of FIG. 15 are arranged in the order beginning with the first child node of the structure below the root node, using the root node as a start point. Concerning the structure below each child node, the numbers of detections are arranged in the order beginning with the highest-class node of the structure data and ending with the lowest-class node. In other words, when the respective numbers of detections of nodes are arranged in the order of the nodes "BOOK", "TITLE", "AUTHORS", "AUTHOR", "FIRST NAME, "LAST NAME", "ABSTRACT" and "KEYWORD", data [1][1][3*] [1][1][0][1] is acquired.

As shown in FIG. 16, the differential structure registration unit 34 stores, into the differential-structure-data storage 113, the acquired differential structure data with a node ID "T8" (called management information) attached thereto, the node ID "8" being assigned to the last node of the common structure data used to acquire the differential structure data.

FIG. 16 shows an example of storage of differential structure data. As shown, the differential-structure-data storage 113 stores the differential structure data of the document A and that of the document B.

The differential structure data of the document A is arranged in a data array form, actually, in a numeral sequence of [1][1][2*][1][1][1]. Each data item has the following meaning:
- [1]: The node "TITLE" is detected once;
- [1]: The node "AUTHORS" is detected once;
- [2*]: The structure using the node "AUTHOR" as a root is detected twice;
- [1]: The node "AUTHOR/FIRST-NAME" is detected once;
- [1]: The node "AUTHOR/LAST-NAME" is detected once; and
- [1]: The node "ABSTRACT" is detected once.

The differential structure data of the document B is arranged in a data array form, actually, in a numeral sequence of [1][1][3*][1][1][0][1]. Each data item has the following meaning:
- [1]: The node "TITLE" is detected once;
- [1]: The node "AUTHORS" is detected once;
- [3*]: The structure using the node "AUTHOR" as a root is detected three times;
- [1]: The node "AUTHOR/FIRST-NAME" is detected once;
- [1]: The node "AUTHOR/LAST-NAME" is detected once;
- [0]: The node "ABSTRACT" is detected zero time, i.e., is not detected; and
- [1]: The node "KEYWORD" is detected once.

The management information attached to each differential structure data item indicates the maximum node number from which the range of the common structure data used to each differential structure data item can be determined. Each time new structured document data having a node that is not included in the common structure data is stored, this node is added to the common structure data. Since the number of nodes is thus simply increased, the management information indicates the range of common structure data, using which each differential structure data item is generated.

Figures 22, 23:
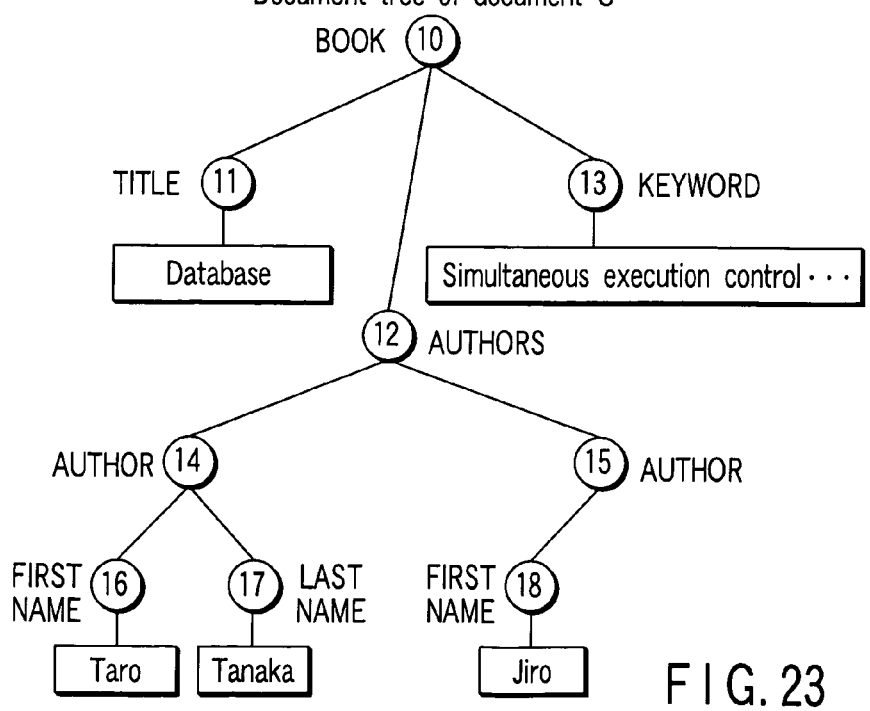
FIG. 22 is a view illustrating yet another example (document C) of structured document data.
FIG. 23 is a view illustrating the document tree of the document C.

FIG. 22 shows another example of the structured document data, which has a structure similar to that of the structured document data (document A) of FIG. 3 or that of the structured document data (document B) of FIG. 4. Namely, in the structured document data (document C) of FIG. 22, the node "AUTHORS" has two nodes "AUTHOR", and the second node "AUTHOR" does not have a node "LAST NAME". Further, no node "ABSTRACT" exists, but a node "KEYWORD" exists.

FIG. 23 shows the document tree of the document C shown in FIG. 22.

FIG. 24 shows structure data acquired by performing the structure-data extraction process shown in FIG. 18, based on the document tree of the document C shown in FIG. 23.

When the document C of FIG. 22 is stored, common structure data to be stored into the common-structure-data storage 112 by the common structure registration process of FIG. 19 is identical to that shown in FIG. 13. Therefore, if the common structure data shown in FIG. 13 is already stored in the common-structure-data storage 112, it is not updated. FIG. 25 shows first differential structure data acquired by performing the differential structure registration process of FIG. 20 using the structure data of FIG. 24 and the common structure data of FIG. 13.

In the first differential structure data of FIG. 25, two sub-trees using the node "AUTHOR" as a root exist under the node "AUTHORS", and one of the sub-trees does not have the node "LAST NAME". Further, the node "ABSTRACT" with attribute information "0" indicating that the number of detections is zero is added to the node "BOOK". Similarly, the node "LAST NAME" with attribute information "0" indicating that the number of detections is zero is added to the second node "AUTHOR". The second differential structure data shown in FIG. 26 includes the node "ABSTRACT" with attribute information "0" indicating that the number of detections is zero.

Figure 27:
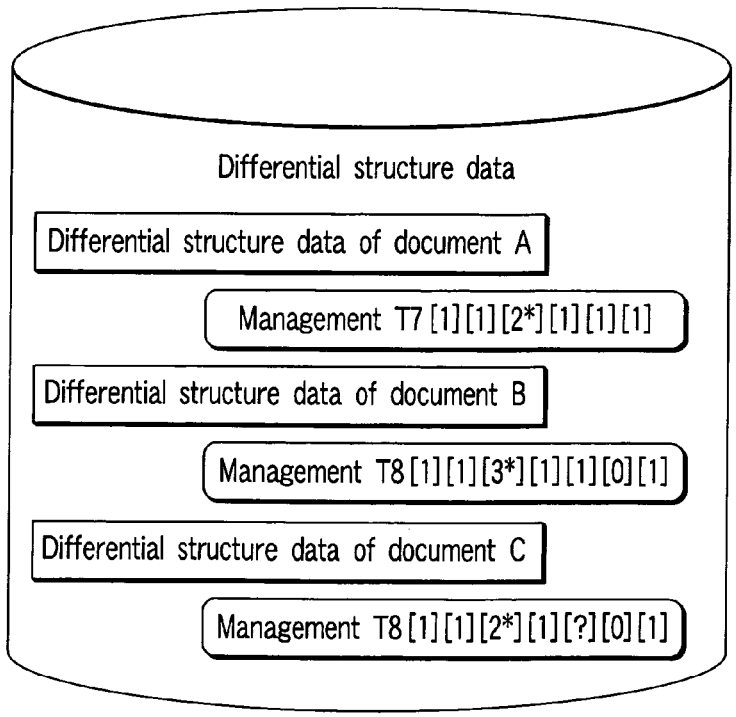
FIG. 27 is a view illustrating a storage example of differential structure data.

The second differential structure data shown in FIG. 26 can be expressed in a numeral sequence of [1][1][2*][1][?][0][1]. As shown in FIG. 27, the differential structure registration unit 34 stores, into the differential-structure-data storage 113, the differential structure data with a node ID "T8" attached thereto, the node ID "8" being assigned to the last node of the common structure data used to acquire the differential structure data.

Figure 28:
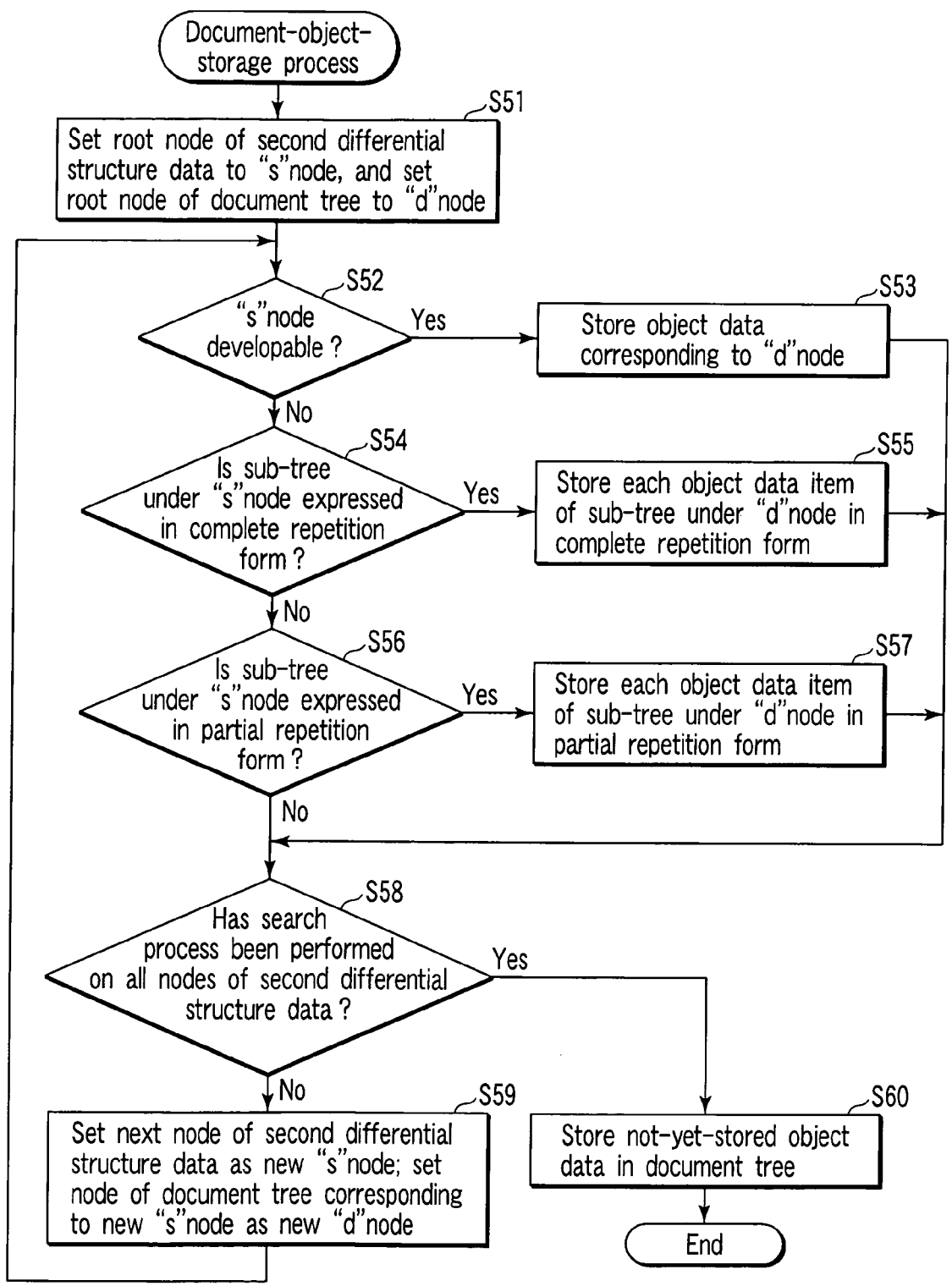
FIG. 28 is a flowchart useful in explaining a document-object storage process.

Referring to the flowchart of FIG. 28, a description will be given of the operation of the document-object-storing unit 35, using the case of storing the document tree (see FIG. 11) of the document B as an example. While downwardly following the second differential structure of FIG. 15 in the order beginning with the root node, firstly, object data items of the document tree corresponding to the nodes of the common structure data are sequentially stored into the document-object-data storage 115, and then the indefinite node and text node of the document are sequentially stored into it.

Specifically, the root node (node "BOOK") of the second differential structure data acquired by the differential structure registration unit 34 and shown in FIG. 15 is set as an "s"node. Further, the root node (node "BOOK") of the document tree of FIG. 11 is set as a "d"node (step S51).

If the "s"node is expressed in a developed form (Yes at step S52), the object data corresponding to the "d"node of the document tree is stored into the document-object-data storage 115 (step S53). At present, since the "s"node is set to the node "BOOK" that is in the developed form, the object data, i.e., "BOOK", corresponding to the "d"node is stored into the first slot (slot ID=0) of the document-B-storage area of the document-object-data storage 115, as shown in FIG. 17.

After that, at step S59, the "s"node and "d"node are updated, followed by the program returning to step S52. At step S59, the next node of the second differential structure data, i.e., the node "TITLE", is set as the "s"node, and the node of the document tree corresponding to this "s"node, i.e., the node "TITLE", is set as the "d"node.

Also in this case, the "s"node is expressed in the developed form (Yes at step S52), therefore the object data corresponding to the present "d"node, i.e., "TITLE", is stored into the second slot (slot ID=1) of the document-B-storage area of the document-object-data storage 115, as shown in FIG. 17 (step S53).

Thereafter, at step S59, the next node of the second differential structure data, i.e., the node "AUTHORS", is set as the "s"node, and the node of the document tree corresponding to this "s"node, i.e., the node "AUTHORS", is set as the "d"node, followed by the program returning to step S52.

Also in this case, the "s"node is expressed in the developed form (Yes at step S52), therefore the object data corresponding to the present "d"node, i.e., "AUTHORS", is stored into the third slot (slot ID=2) of the document-B-storage area of the document-object-data storage 115, as shown in FIG. 17 (step S53).

Thereafter, at step S59, the next node of the second differential structure data, i.e., the node "AUTHOR", is set as the "s"node, and the node of the document tree corresponding to this "s"node, i.e., the node "AUTHOR", is set as the "d"node, followed by the program returning to step S52.

In this case, since the attribute information "3" attached to the "s"node indicates that the number of detections is 3 (No at step S52), and the sub-tree under the "s"node is expressed in the complete repetition form (Yes at step S54), the object data items in the sub-trees under the "d"node of the document tree are stored into the document-object-data storage 115 in the complete repetition form (step S55). More specifically, in the document tree shown in FIG. 11, since three sub-trees using the "d"node (i.e., the node "AUTHOR") as a root are detected, the operation of sequentially storing object data items "AUTHOR", "FIRST NAME" and "LAST NAME" included in each sub-tree into continuous three slots is repeated three times. As a result, as shown in FIG. 17, the object data items included in the first sub-tree are stored into the fourth slot (slot ID=3) to the sixth slot (slot ID=5) of the document-B-storage-area of the document-object-data storage 115. Similarly, the object data items included in the second sub-tree are stored into the seventh slot (slot ID=6) to the ninth slot (slot ID=8), and the object data items included in the third sub-tree are stored into the tenth slot (slot ID=9) to the twelfth slot (slot ID=11).

Since the number of detections of the node "ABSTRACT" included in the second differential structure data is "0", this node is ignored and the node "KEYWORD" is set as the "s"node, and the node corresponding to the "s"node and included in the document tree, i.e., the node "KEYWORD", is set as "d"node at step S59. Then, the program returns to step S52.

Also in this case, the "s"node is expressed in the developed form (Yes at step S52), therefore the object data corresponding to the present "d"node, i.e., "KEYWORD", is stored into the thirteenth slot (slot ID=12) of the document-B-storage area of the document-object-data storage 115, as shown in FIG. 17 (step S53).

Thus, detection of all nodes of the second differential structure data is finished (Yes at step S58), followed by the program proceeding to step S60, where the object data items of the document tree that are not yet stored are stored into the document-object-data storage 115. More specifically, object data items corresponding to text data items are sequentially stored into, for example, the slot with slot ID=21 and seq. in the same storage order as that of object data items corresponding to respective nodes of the common structure data, as is shown in FIG. 17.

A description will be given of the operation of the document-object-storing unit 35, using, as an example, the case of storing the document tree of the document C (see FIG. 23). The document-object-storing unit 35 stores each object data item of the document tree, using the second differential structure data shown in FIG. 26. The operation of storing object data items corresponding to the nodes ranging from the root node to the node "AUTHORS" is the same as that performed in the document B. Only the points different from those in the document B will be described.

At step S59, the next node of the second differential structure data, i.e., the node "AUTHOR", is set as the "s"node, and the node of the document tree C corresponding to the "s"node, i.e., node "AUTHOR", is set as the "d"node, followed by the program returning to step S52.

In this case, since the attribute information "2" attached to the "s"node indicates that the number of detections is 2 (No at step S52), and the sub-tree under the "s"node is expressed in the partial repetition form (No at step S54, Yes at step S56), the object data items in the sub-trees under the "d"node of the document tree are stored into the document-object-data storage 115 in the partial repetition form (step S57).

More specifically, in the document tree shown in FIG. 23, although two sub-trees using the "d"node (i.e., the node "AUTHOR") as a root are detected, the second sub-tree does not have node "LAST NAME". Accordingly, in the second differential structure data, the node "LAST NAME" is treated as an indefinite node. The object data corresponding to the indefinite node is not stored at step S57, but stored at step S60.

Figure 30:
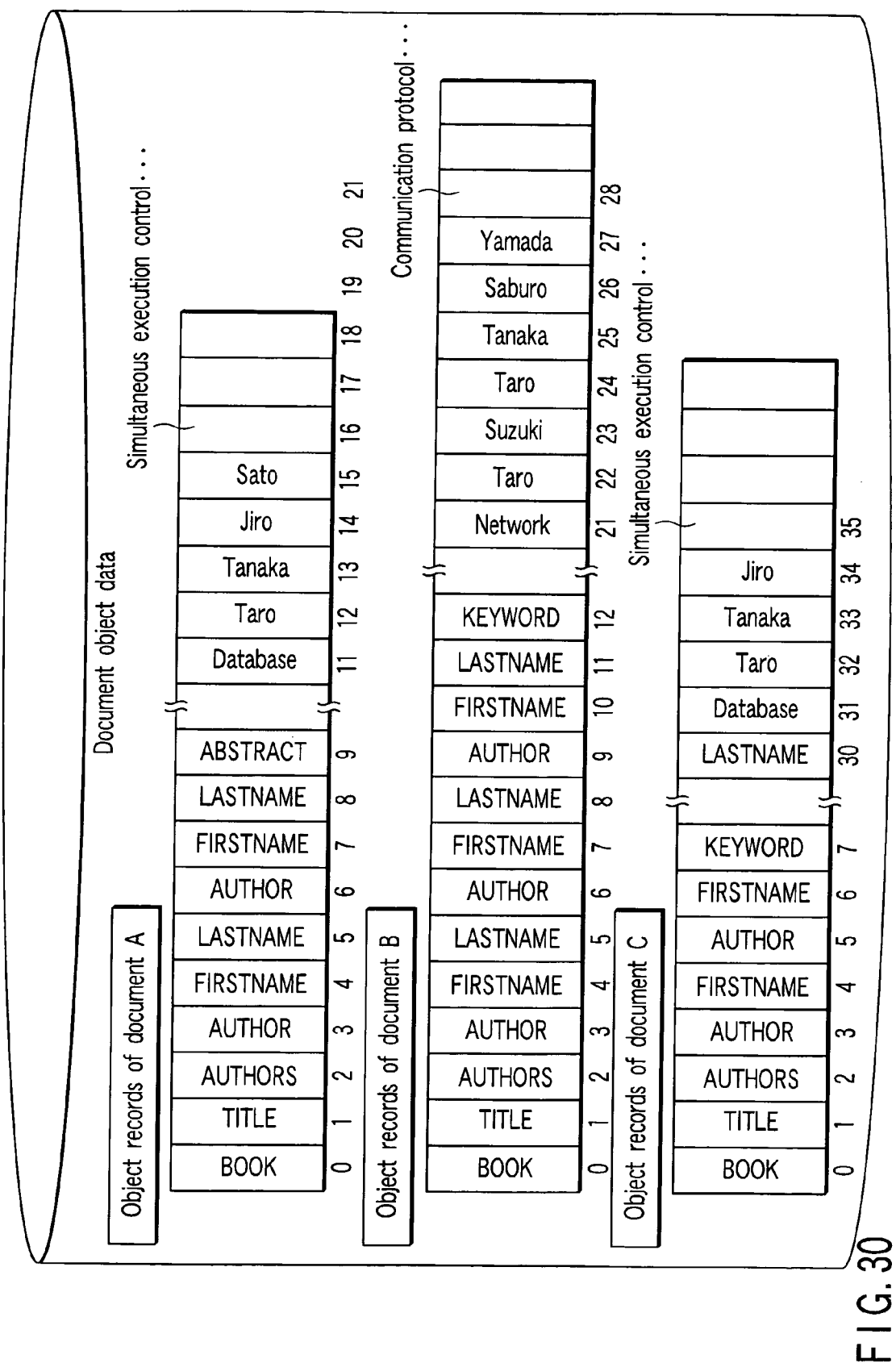
FIG. 30 is a view illustrating a storage example of document object records (array)

At step S57, firstly, the operation of sequentially storing, into two successive slots, the object data items "AUTHOR" and "FIRST NAME" included in each sub-tree is repeated twice. As a result, as shown in FIG. 30, the object data items included in the first sub-tree are stored into the fourth slot (slot ID=3) and the fifth slot (slot ID=4) of the document-C-storage-area of the document-object-data storage 115. Similarly, the object data items included in the second sub-tree are stored into the sixth slot (slot ID=5) and the seventh slot (slot ID=6).

Thereafter, in the same manner as in the case of storing the document B, the object data "KEYWORD" is stored into the slot with slot ID=7.

Thus, detection of all nodes of the second differential structure data is finished (Yes at step S58), followed by the program proceeding to step S60, where the object data of the document tree that is not stored at step S57 is stored into the document-object-data storage 115. More specifically, the object data "LAST NAME" of the first sub-tree is stored into, for example, the slot with slot ID=30 as shown in FIG. 30. After that, object data items corresponding to text data items are sequentially stored into, for example, the slot with slot ID=31 and seq. in the same storage order as that of object data items corresponding to respective nodes of the common structure data, as is shown in FIG. 30.

FIG. 30 shows storage examples of document object records, i.e., the document object records of the documents A, B and C. The document object records are stored in relation to document IDs corresponding thereto. Each object data item in each document is uniquely specified from the document ID and slot ID. In other words, if an object ID including a document ID and slot ID is given, any object data item can be accessed.

The document-object-storing unit 35 stores each object data item of each document tree into the document-object-data storage 115, and updates the index data storage 114 based on each object data item in each document tree. Index data indicates the relationship between the text data of a text element in the stored structured document data, and the object ID (OID) assigned to an element in the structured document data, which includes the text data.

Figure 29:
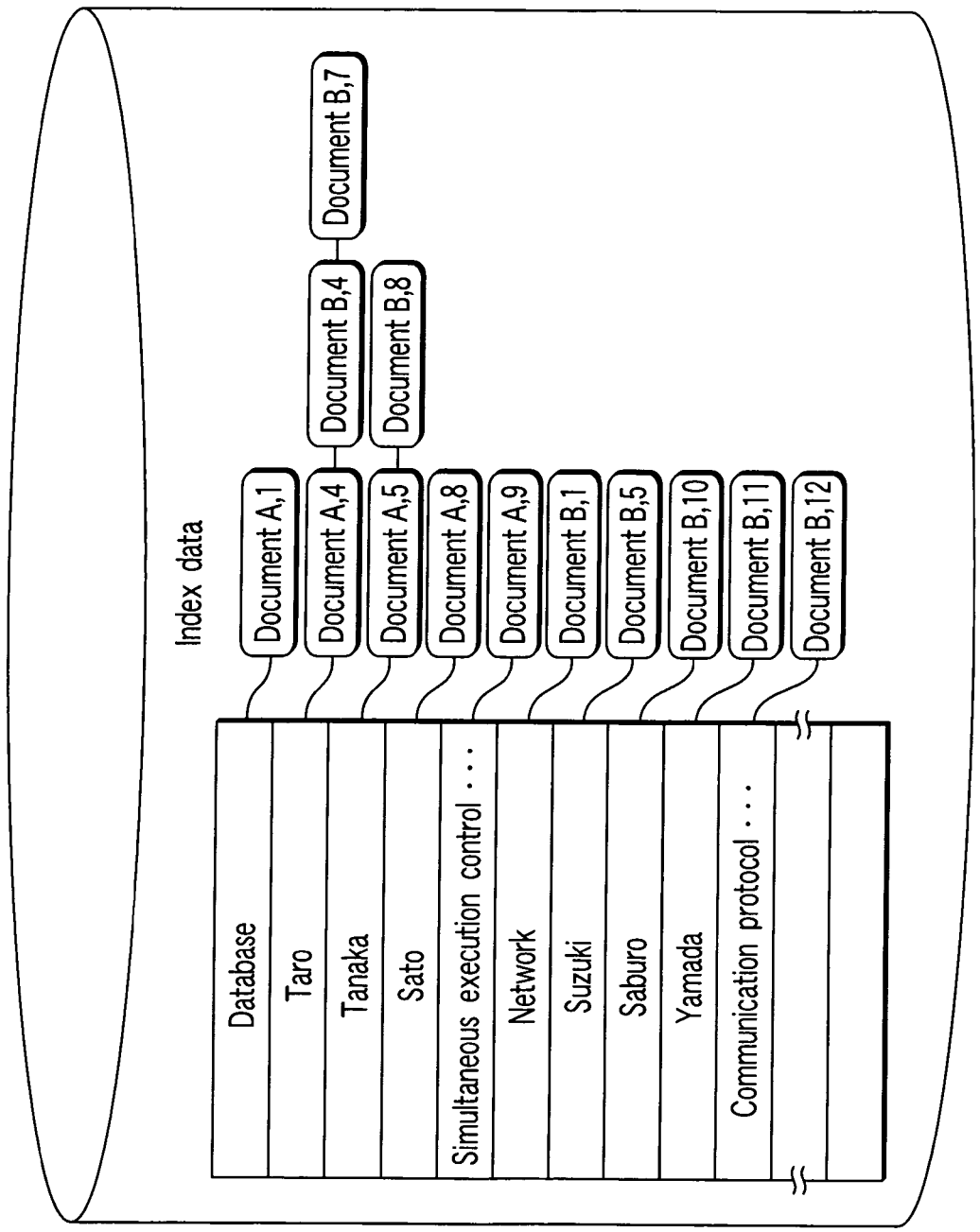
FIG. 29 is a schematic view illustrating the data structure of index data stored in index data storage.

As shown in FIG. 29, the index data storage 114 stores a term table, and a plurality of tables storing OIDs assigned to text elements that are linked to terms contained in the term table and include the term themselves. By following the link of a term contained in the term table, the detection position of a text element including the term, i.e., OID, is acquired.

The object ID of each object data item is expressed as <Document ID, Slot ID>. The document IDs of the documents A, B and C are "Document A", "Document B" and "Document C", respectively.

(Search)

The operation of the search processing unit 104 of FIG. 1 will be described.

FIG. 31 shows an example of query data input to the search processing unit 104. In XML, XQuery (XML Query Language) developed by W3C is used, and a query describing method based on this language is utilized.

The query data shown in FIG. 31 describes the AND condition that an element "BOOK" exists in the hierarchical tree of a structured document DB "DB", an element "AUTHOR" exists in the element "BOOK", and the element "AUTHOR" contains an element "FIRST NAME" with a text element containing a character string "Taro" and an element "LAST NAME" with a text element containing a character string "Tanaka".

Such query data as shown in FIG. 31 is transmitted from the search unit 203 of the client 201 to the request processing unit 102 of the server 101.

Figure 32:
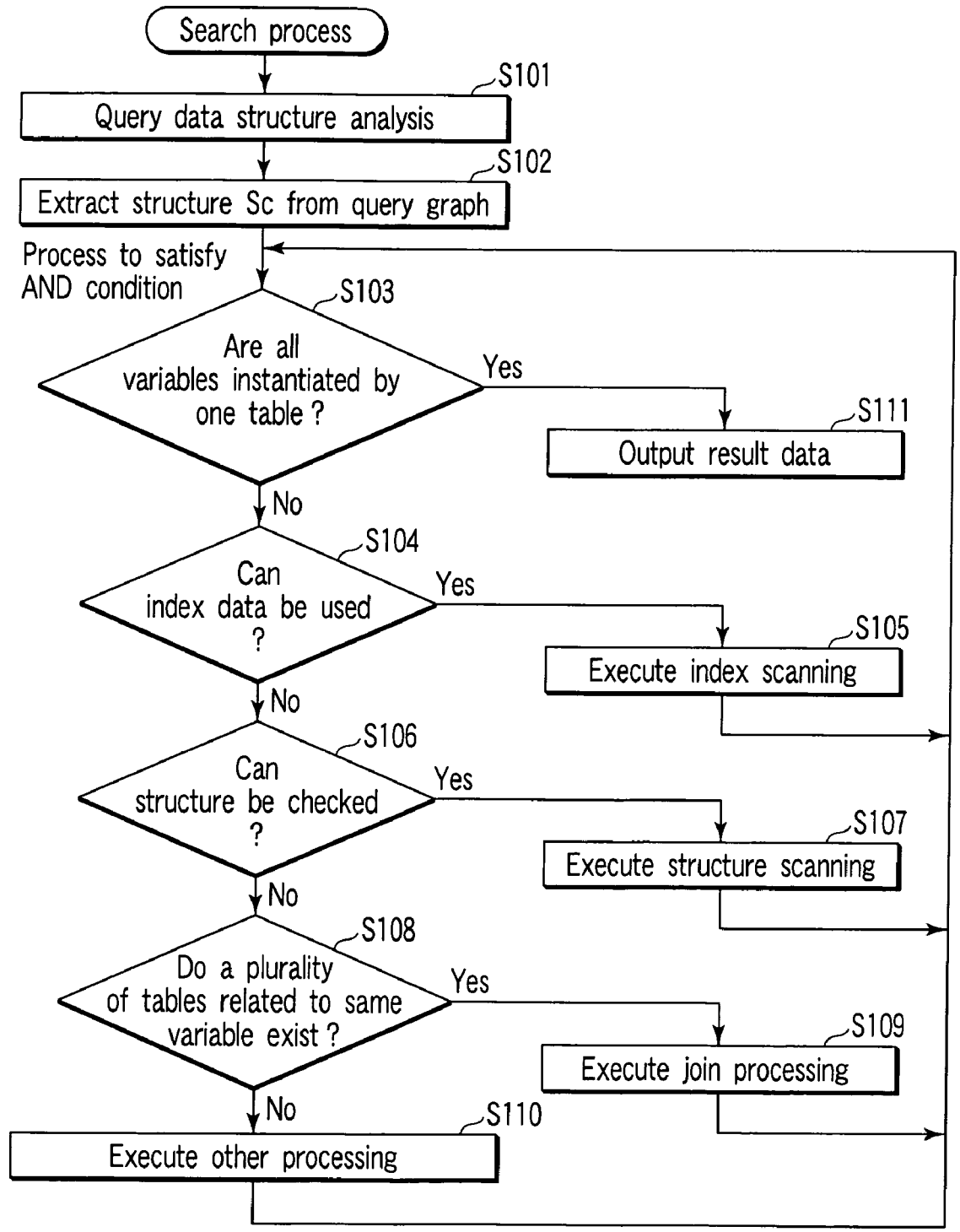
FIG. 32 is a flowchart useful in explaining the outline of the operation of a search processing unit.

Referring then to the flowchart of FIGS. 32 and 33, a brief description will be given of the operation of the search processing unit 104 performed upon receiving such query data as shown in FIG. 31.

The query data received by the request processing unit 102 is transferred to the query data analysis unit 41 of the search processing unit 104. The query data analysis unit 41 analyzes the construction of the received query data, and extracts a graph structure called a query graph, based on the analysis results (steps S101 and S102). For instance, such a query graph as shown in FIG. 34 is acquired from the query data shown in FIG. 31. Such a structure in query data as can be expressed by the query graph will hereinafter be referred to as "Sc".

As shown in FIG. 34, the query graph is formed by connecting variables corresponding to the elements (such as db "DB", "BOOK", "AUTHOR", "FIRST NAME" and "LAST NAME") and character strings (such as "Taro" and "Tanaka"), contained in query data, in accordance with the hierarchical relation between the elements and the inclusion relation between the character strings.

In the query graph shown in FIG. 34, variables are represented by circular nodes, and variable names are written in the circles. These nodes are called variable nodes. Further, the elements designated in the query data are represented by hexagonal nodes with "TAG" written therein. These nodes are called tag nodes. In addition, the character strings designated in the query data are represented by hexagonal nodes with "CMP" written therein. These nodes are called value-comparison tags.

After that, the query execution unit 42 sequentially generates data that represents all possible combinations of values the variable groups, called tables, can take, aiming at the instantiation of all variables in the query graph.

Specifically, it is firstly determined whether all variables contained in the query graph are instantiated by one table (step S103). If the answer to the question at step S103 is Yes, i.e., if all variables are instantiated, the instantiated variables are output as search results at step S111. The values the variable can take indicate OIDs.

If all variables contained in the query graph are not instantiated (Yes at step S104), the process ranging from step S104 to step S110 is repeated until they are instantiated.

At step S104, it is determined whether a search using index data stored in the index data storage 114 is possible. If there is a term index function, such as "contains", exists, a high-speed search using index data in the structured document DB 111 can be realized. In this case, the index scan unit 44 executes index scanning (step S105).

If a certain variable on the query graph is instantiated, if a variable belonging to a lower class than the certain variable is instantiated, and if a variable belonging to a higher class than the certain variable is not instantiated (No at step S106), the structure scan unit 43 executes structure scanning (step S107).

At step S108, it is determined whether a plurality of tables contain the same variable. If the answer to the question at step S108 is Yes, the data joining unit 45 executes join processing for joining the plurality of tables (step S109).

If the answer to the question at step S108 is No, processing other than the above is executed at step S110.

As aforementioned, at step S111, result output processing is performed. At this time, the possible combinations of values the variables can take (i.e., the possible combinations of OIDs) are acquired as tables. Each combination is formed of a plurality of OIDs with the same document ID. Accordingly, each combination corresponds to a single structured data item. A group of structured document data items corresponding to the query data can be acquired by fetching, from the document-object-data storage 115, structure data corresponding to each document ID that is acquired from the combinations as the tables.

Figure 35:
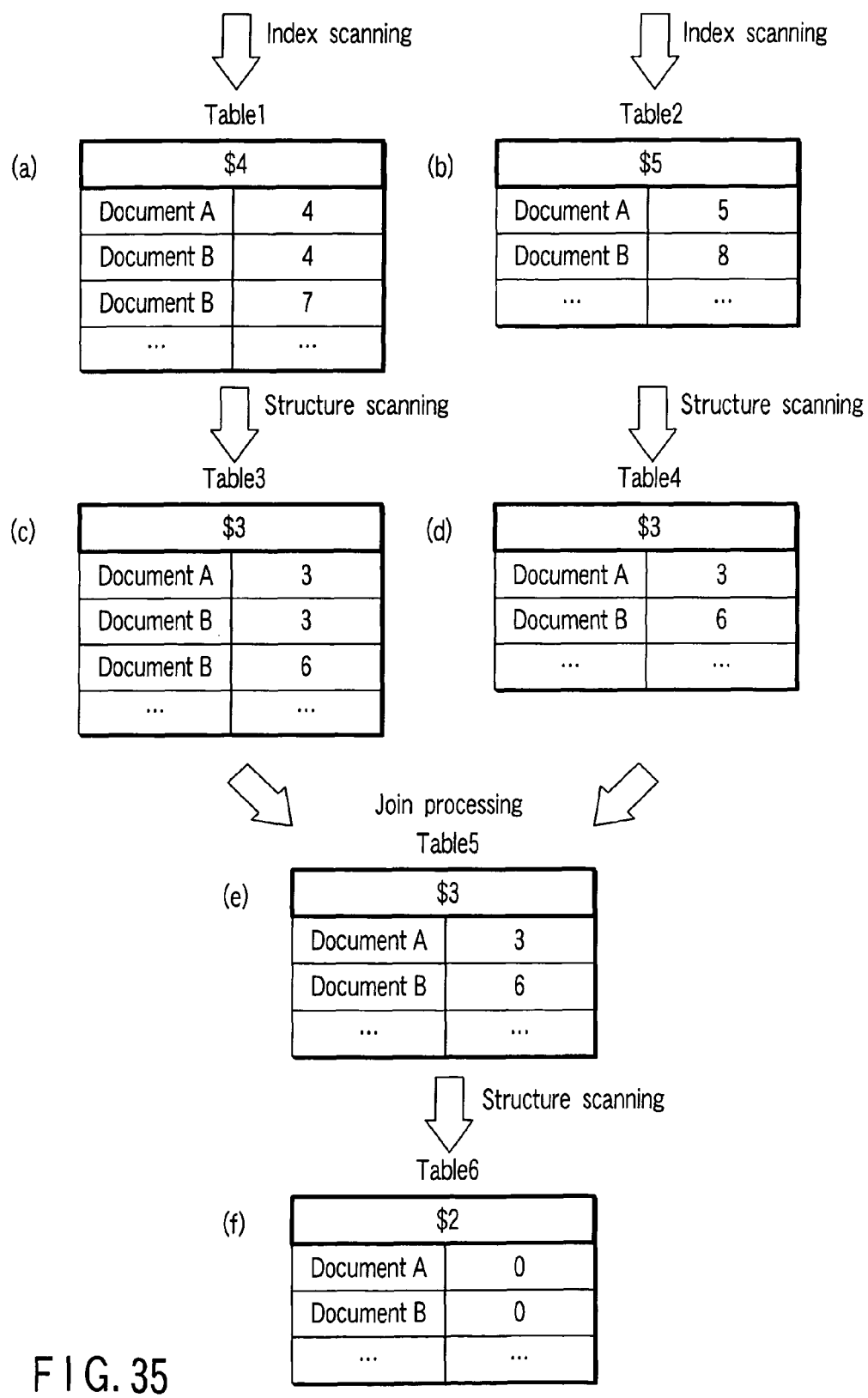
FIG. 35 is a view useful in explaining a search process based on the query graph of FIG. 34.

FIG. 35 is a view useful in explaining the search process based on the query graph of FIG. 34.

(1) Since the query graph contains value comparison tag nodes, and the term index function "contains", index scanning is performed on the character string "Taro", using such index data as shown in FIG. 29. As a result, variable node $4 is instantiated (see Table 1 shown in FIG. 35). Namely, <Document A, 4>, <Document B, 4> and <Document B, 7> are acquired as OIDs corresponding to variable node $4.

(2) Similarly, index scanning is performed on the character string "Tanaka", using such index data as shown in FIG. 29. As a result, variable node $5 is instantiated (see Table 2 shown in FIG. 35). Namely, <Document A, 5> and <Document B, 8> are acquired as OIDs corresponding to variable node $5.

(3) Since the variable nodes $4 and $5 is instantiated, structure scanning is performed to instantiate a variable node belonging to a higher class than those variable nodes.

Structure scanning is described with reference to the flowchart of FIG. 33.

Firstly, from Tables 1 and 2 in FIG. 35, document IDs contained in the object IDs corresponding to variable nodes $4 and $5 are read (step S121).

Differential structure data corresponding to each document ID and common structure data (corresponding to the management information attached to the differential structure data) are read from the common-structure-data storage 112 and differential-structure-data storage 113, respectively (step S122).

From the differential structure data and common structure data corresponding to each document ID, structure data corresponding to each document ID is reconstructed (step S123).

For instance, to reconstruct the structure data of the document A, the sub-tree of the differential structure data expressed in the complete repetition form as shown in FIG. 10 is expressed in the original developed form, thereby reconstructing such structure data as shown in FIG. 7.

Further, to reconstruct the structure data of the document B, the sub-tree of the differential structure data expressed in the complete repetition form as shown in FIG. 15 is expressed in the original developed form, and the node "ABSTRACT" with the attribute information "0" indicating that the number of detections is zero is eliminated. As a result, such structure data as shown in FIG. 12 is reconstructed.

Subsequently, the structure data of each reconstructed document is traversed upwardly, beginning with each object data item in Table 1, thereby detecting a node identical to a higher-class variable node on the query graph (step S124).

If the node identical to the higher-class variable node on the query graph is an indefinite node, the program proceeds to step S127 since the slot ID of the indefinite node cannot be specified (No at step S125). In contrast, if the node identical to the higher-class variable node on the query graph is a definite node, the program proceeds to step S126 since the slot ID of the node can be specified from the structure data (Yes at step S125).

A description will now be given of a method for determining whether the slot ID can be specified at step S125. As described before, the document-object-storing unit 35 stores each document in the form of an object data array. The position information items assigned to the respective elements in the array are slot IDs. As shown in FIG. 30, object data items corresponding to the respective nodes of common structure data are stored in order beginning with the leading data item of the array (beginning with the leftmost node of the differential structure data, and beginning with the highest-class node of the differential structure data). After that, indefinite nodes or text nodes in the document tree are stored.

By traversing the reconstructed structure data beginning with the root node, the sum of the numbers of detections of the nodes except for indefinite nodes "?" is acquired. If a higher-class node is detected several times (e.g., 2*), calculation of the sum is performed in consideration of the number of detections of the higher-class node. If the slot ID is greater than the sum, the slot ID cannot be specified.

In the case of, for example, the document C of FIG. 23, except for the indefinite node "LAST NAME", the element "TITLE" is detected once, the element "AUTHORS" is also detected once, the element "AUTHOR" is detected twice, the element "FIRST NAME" belonging to each element "AUTHOR" is detected once, and the element "KEYWORD" is detected once. Accordingly, the total number of detections of all nodes of the document C is given by $$1+1+2\times(1+1)+1=7$$

Therefore, the slot ID higher than "7" cannot be specified.

At step S126, the slot IDs of nodes acquired while downwardly following each structure data item are calculated. For example, the slot ID of a certain node can be detected by counting the number of object data items that exist in the range from the root node of each structure data item to the certain node.

At step S127, to detect the slot ID of each acquired node, the object records corresponding to each document ID and stored in the document-object-data storage 115 are searched.

Thus, each structure data item reconstructed is scanned. As a result, Table 3 corresponding to variable node $3 and shown in FIG. 35 is acquired from Table 1 corresponding to variable node $4 and shown in FIG. 35, and Table 4 corresponding to variable node $3 and shown in FIG. 35 is acquired from Table 2 corresponding to variable node $5 and shown in FIG. 35 (step S128).

A description will be given of how to acquire, from Table 1, Table 3 corresponding to variable node $3 and shown in FIG. 35. Variable node $3 in FIG. 34 is related to the node "AUTHOR". Referring to the reconstructed structure data of the document A of FIG. 7, the node "AUTHOR" is acquired by upwardly following the structure data from the node "FIRST NAME" with slot ID=4. The slot ID of the node "AUTHOR" is "3" since this node is stored in the fourth slot counted from the root node with slot ID=0.

Similarly, referring to the reconstructed structure data of the document B of FIG. 12, the node "AUTHOR" is acquired by upwardly following the structure data from the node "FIRST NAME" with slot ID=4. The slot ID of the node "AUTHOR" is "3" since this node is stored in the fourth slot counted from the root node with slot ID=0.

Similarly, referring to the structure data of the document B of FIG. 12, the node "AUTHOR" is acquired by upwardly following the structure data from the node "FIRST NAME" with slot ID=7. Since the slot ID of the node "AUTHOR" is "6" since this node is stored in the seventh slot counted from the root node with slot ID=0.

Thus, the variable node $3 is instantiated from Table 1, as is shown in Table 3 of FIG. 35. Namely, data items <Document A, 3>, <Document B, 3> and <Document B, 6> are acquired as OIDs corresponding to variable node $3.

A description will be given of how to acquire, from Table 2, Table 4 corresponding to variable node $3 and shown in FIG. 35. Variable node $3 in FIG. 34 is related to the node "AUTHOR". Referring to the reconstructed structure data of the document A of FIG. 7, the node "AUTHOR" is acquired by upwardly following the structure data from the node "LAST NAME" with slot ID=5. The slot ID of the node "AUTHOR" is "3" since this node is stored in the fourth slot counted from the root node with slot ID=0.

Similarly, referring to the reconstructed structure data of the document B of FIG. 12, the node "AUTHOR" is acquired by upwardly following the structure data from the node "LAST NAME" with slot ID=8. The slot ID of the node "AUTHOR" is "6" since this node is stored in the seventh slot counted from the root node with slot ID=0.

Thus, the variable node $3 is instantiated from Table 2, as is shown in Table 4 of FIG. 35. Namely, data items <Document A, 3> and <Document B, 6> are acquired as OIDs corresponding to variable node $3.

(4) As described in the above items (2) and (3), the variable node $3 is instantiated in different ways, as shown in Tables 3 and 4. Subsequently, Tables 3 and 4 are joined. Specifically, since Tables 3 and 4 contain common OIDs <Document A, 3> and <Document B, 6>. Accordingly, Table 5 containing these OIDs is acquired as shown in FIG. 35.

(5) Since variable nodes $4, $5 and $3 are instantiated, structure scanning is performed to instantiate elements corresponding to variable node $2 ("BOOK") of a higher class than those variable nodes.

Figure 33:
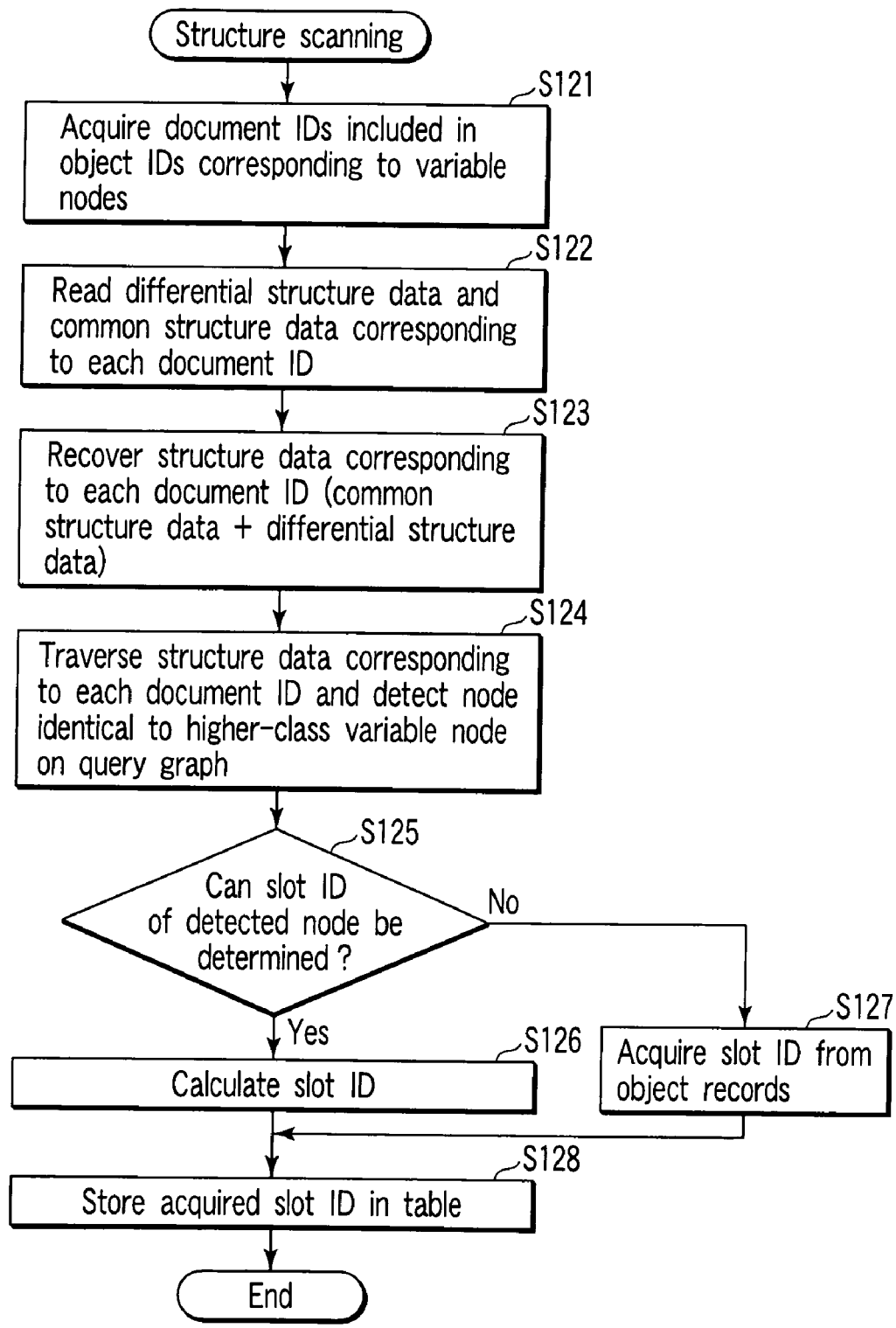
FIG. 33 is a flowchart useful in explaining the operation of a structure scan unit.

Firstly, structure scanning as illustrated in FIG. 33 is performed on OID <Document A, 3>. Specifically, referring to the reconstructed structure data of the document A of FIG. 7, the node "BOOK" as the higher-class node of the node "AUTHOR" with slot ID=3 is specified. The slot ID of the node "BOOK" is "0", i.e., the node "BOOK" is the root node of the structure data.

Subsequently, structure scanning as illustrated in FIG. 33 is performed on OID <Document B, 6>. Specifically, referring to the reconstructed structure data of the document B of FIG. 12, the node "BOOK" as the higher-class node of the node "AUTHOR" with slot ID=6 is specified. The slot ID of the node "BOOK" is "0", i.e., the node "BOOK" is the root node of the structure data.

Thus, the variable node $2 is instantiated, as is shown in Table 6 of FIG. 35. Namely, <Document A, 0> and <Document B, 0> are acquired as OIDs corresponding to variable node $2.

OIDs <Document A, 0> and <Document B, 0> are output from the query execution unit 42 as search results. The result generation unit 46 generates result data based on the OIDs acquired as the search results (see FIG. 36).

FIG. 36 shows a result data example that satisfies the query data shown in FIG. 31. The result data is generated by reading, from the document-object-data storage 115, part or all of the structured document data of the nodes of OIDs not lower than the OIDs contained in Table 6 of FIG. 36. The result data shown in FIG. 36 contains the documents A and B.

Such search data as shown in FIG. 36 is sent from the request processing unit 102 to the client 201 as the requester. The client 201 displays the received structure data on a display incorporated in the output unit 205.

Figures 37, 38:
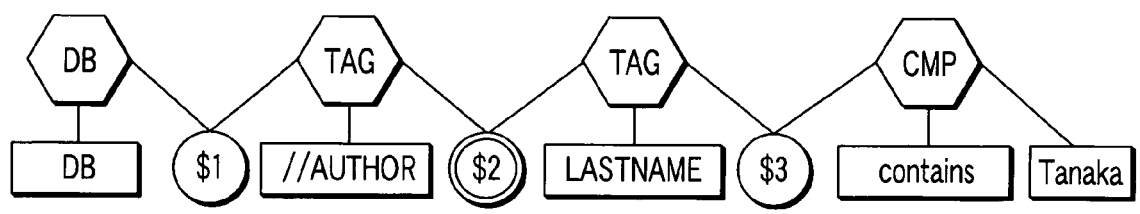
FIG. 37 is a view illustrating another query data example.
FIG. 38 is a view illustrating a query graph acquired from the query data of FIG. 37.

FIG. 37 shows another example of the query data. This query data requests to search a list of elements "AUTHOR" that are included in elements "BOOK" and include respective elements "LAST NAME" each including a character string "Tanaka". The query data of FIG. 31 requests to search a list of elements "BOOK", whereas the query data of FIG. 37 requests to search a list of elements "AUTHOR".

In the case of the query data shown in FIG. 37, such a query graph as shown in FIG. 38 is acquired.

FIG. 39 is view useful in explaining a search process based on the query graph of FIG. 38.

(1) Since the query graph contains value comparison tag nodes, and the term index function "contains", index scanning is performed on the character string "Tanaka", using such index data as shown in FIG. 29. As a result, the variable node $3 is instantiated (see Table 7 shown in FIG. 39). Namely, <Document A, 5> and <Document B, 8> are acquired as OIDs corresponding to variable node $3.

(2) Since the variable node $3 is instantiated, structure scanning is performed to instantiate the variable node $2 belonging to a higher class than those variable nodes.

Firstly, the structure data items of the documents A and B are reconstructed from the differential structure data between the documents A and B, and from the common structure data corresponding to the management information attached to the differential structure data.

The node "AUTHOR" is acquired by upwardly following the structure data of the document A of FIG. 7 from the node "LAST NAME" with slot ID=5. The slot ID of the node "AUTHOR" is "3" since this node is stored in the fourth slot counted from the root node with slot ID=0.

Similarly, the node "AUTHOR" is acquired by upwardly following the structure data of the document B of FIG. 12 from the node "LAST NAME" with slot ID=8. The slot ID of the node "AUTHOR" is "6" since this node is stored in the seventh slot counted from the root node with slot ID=0.

Thus, the variable node $2 is instantiated, as is shown in Table 3 of FIG. 39. Namely, <Document A, 3> and <Document B, 6> are acquired as OIDs corresponding to variable node $2.

These two OIDs are search results that satisfy the query data shown in FIG. 37.

The result generation unit 46 generates result data by reading, from the document-object-data storage 115, part or all of the structured document data of the nodes of OIDs not lower than the OIDs contained in Table 8 of FIG. 39. The result data shown in FIG. 40 contains sub-documents of the document A belonging to the nodes with slot IDs not lower than 3 (the node with slot ID=3 is the first node "AUTHOR"), and sub-documents of the document B belonging to the nodes with slot IDs not lower than 6 (the node with slot ID=6 is the second node "AUTHOR").

As described above, in the embodiment, to store new structured document data into the structured document DB 111, the differential structure between a common structure and the structure of the new structured document data is acquired. The common structure means a common structure included in each structured document data item already stored in the structured document DB 111, and included in the new structured document data. This differential structure can be acquired by updating the common structure of each structured document data item already stored in the structured document DB 111, using the structure of the new structured document data. The array of the elements of the new structured document data, arranged in accordance with the differential structure, is stored into the document-object-data storage 115.

In the above-described embodiment, when new structured document data is stored, the common structure is updated using the structure of the new structured document data. Further, the differential structure between the updated common structure and the structure of the new structured document data, and the array of the elements of the new structured document data are stored. Accordingly, the amount of data necessary to store concerning new structured document data can be significantly reduced. Furthermore, since the position of each element of the array corresponds to the position of each element in the differential structure, the storage area of any element can be easily determined from the structure of the new structured document data.

In addition, when a structured document data item stored in the structured document DB 111 is searched to detect a desired element (designated by search conditions), the structure of the structured document data item is reconstructed from the differential structure between the structure of the structured document data item and a common structure that covers the structure of the structured document data item and those of the other structured document data items stored in the DB 111. From the reconstructed structure, the desired element is determined. The document-object-data storage 115 stores the array of the elements of the structured document data item arranged in accordance with the differential structure. The position information (slot ID) of the desired element in the array is detected based on the position of the desired element in the reconstructed structure.

As described above, in the embodiment, the structure of each structured document data item stored in the structure document DB 111 is reconstructed and traversed to determine whether it contains a desired element. Further, the storage area (slot ID) of the desired element can be detected with a small number of times of reference to data. As a result, the search for structured document data can be performed at high speed.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method comprising:
    storing a new structured document data item into storage which stores a plurality of structured document data items each including a plurality of elements, each element of each structured document data item being associated with a node indicating a position of that element in a document tree of the structured document data item containing that element;
    acquiring a common structure including a plurality of nodes included in the structured document data items and the new structured document data item;
    acquiring, using a computer processor, a differential structure between the common structure and a structure of the new structured document data item, said differential structure being defined at least in part by an identifier of the new structured document data item and a numeral sequence indicating the differential structure corresponding to the new structured document data item; and
    storing an array of elements of the new structured document data item into the storage, the array being arranged based on the differential structure between the common structure and a structure of the new structured document data item, with a position of each element of the array corresponding to the position of the node associated with that element in the differential structure.

2. A method comprising:
    searching for a desired element and identifying a certain structured document data item containing said element included in a plurality of structured document data items each including a plurality of elements;
    recovering, using a computer processor, a structure of the certain structured document data item, based on a differential structure between the structure of the certain structured document data item and a common structure, the common structure including a plurality of nodes included in the structured document data items, and also including the nodes of the certain structured document data item, said differential structure being defined at least in part by an identifier of the certain structured document data item and a numeral sequence indicating the differential structure corresponding to the certain structured document data item; and
    detecting the desired element from the recovered structure.

3. The method according to claim 2, further comprising acquiring position information indicating a position of the desired element in an array, based on a position of the desired element in the recovered structure, the array being formed of elements of the certain structured document data item arranged based on the differential structure.

4. A non-transitory computer-readable storage medium for use with a computer and storage, comprising computer-executable instructions for:
    instructing the computer to store a plurality of structured document data items each including a plurality of elements, a new structured document data item stored by instruction of the program, each element of each structured document data item being associated with a node indicating a position of that element in a document tree of the structured document data item containing that element;

instructing the computer to acquire a common structure including a plurality of nodes included in the structured document data items and the new structured document data item;

instructing the computer to acquire a differential structure between the common structure and a structure of the new structured document data item, said differential structure being defined at least in part by an identifier of the new structured document data item and a numeral sequence indicating the differential structure corresponding to the new structured document data item; and instructing the computer to store an array of elements of the new structured document data item into the storage, the array being arranged based on the differential structure between the common structure and a structure of the new structured document data item, with a position of each element of the array corresponding to the position of the node associated with that element in the differential structure.

5. A non-transitory computer-readable storage medium for use with a computer and storage, comprising computer-executable instructions for:

instructing the computer to store a plurality of structured document data items each including a plurality of elements, the instructions serving as a search apparatus for searching for a desired element and identifying from said structured document data items a certain structured document data item that contains said element;

instructing the computer to recover the structure of the certain structured document data item, based on a differential structure between the structure of the certain structured document data item and a common structure, the common structure including a plurality of nodes included in the structured document data items, and also including the nodes of the certain structured document data item, said differential structure being defined at least in part by an identifier of the certain structured document data item and a numeral sequence indicating the differential structure corresponding to the certain structured document data item; and instructing the computer to detect the desired element from the recovered structure.

6. A structured-document management apparatus comprising:

data storage which stores a plurality of structured document data items each including a plurality of elements, each element of each structured document data item being associated with a node indicating a position of that element in a document tree of the structured document data item containing that element;

common-structure storage which stores a common structure including a plurality of the nodes included in the structured document data items;

a first acquisition unit configured to acquire a new structured document data item;

an update unit configured to update the common structure into a new common structure including nodes included in the new structured document data item;

a second acquisition unit configured to acquire a differential structure between the new common structure and a structure of the new structured document data item, said differential structure being defined at least in part by an identifier of the new structured document data item and a numeral sequence indicating the differential structure corresponding to the new structured document data item; and a storing unit configured to store an array of elements of the new structured document data item, the array being arranged based on the differential structure, with a position of each element of the array corresponding to the position of the node associated with that element in the differential structure.

7. The apparatus according to claim 6, wherein the second acquisition unit is configured to acquire the differential structure which includes information indicating whether each element of the new common structure exists, and information indicating how many times a sub-structure of the new structured document data item is detected.

8. A search apparatus comprising:

storage which stores a plurality of structured document data items each including a plurality of elements;

an acquisition unit configured to acquire a search condition for searching for a desired element included in the elements; and a search unit configured to search for the desired element and identify from said structured document data items a certain structured document data item that contains said element, the search unit including:

a reconstructing unit configured to recover the structure of the certain structured document data item, based on a differential structure between the structure of the certain structured document data item and a common structure, the common structure including a plurality of structures included in the structured document data items, and also including the structure of the certain structured document data item, said differential structure being defined at least in part by an identifier of the certain structured document data item and a numeral sequence indicating the differential structure corresponding to the certain structured document data item; and a detecting unit configured to detect the desired element from the recovered structure of the certain structured document data item.

9. The apparatus according to claim 8, wherein:

each element of each structured document data item is associated with a node indicating a position of that element in a document tree of the structured document data item containing that element;

the storage is configured to store an array of the elements of the certain structured document data item, the array being arranged based on the differential structure; and the search unit is configured to acquire position information indicating a position of the desired element in the array, based on a position of the desired element in the recovered structure of the certain structured document data item.

* * * * *